(12) United States Patent
Motomura et al.

(10) Patent No.: US 9,330,335 B2
(45) Date of Patent: May 3, 2016

(54) DIAGNOSTIC SUPPORT APPARATUS AND DIAGNOSTIC SUPPORT METHOD

(71) Applicant: Panasonic Corporation, Osaka (JP)

(72) Inventors: Hideto Motomura, Kyoto (JP); Yoshikuni Sato, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 190 days.

(21) Appl. No.: 14/093,199

(22) Filed: Nov. 29, 2013

(65) Prior Publication Data

US 2014/0161327 A1    Jun. 12, 2014

(30) Foreign Application Priority Data

Dec. 11, 2012  (JP) .................................. 2012-270449

(51) Int. Cl.
  G06T 7/00        (2006.01)
  A61B 6/00       (2006.01)
  G06K 9/48       (2006.01)
  G06K 9/62       (2006.01)

(52) U.S. Cl.
  CPC ................ G06K 9/48 (2013.01); G06K 9/6201 (2013.01); G06T 7/0014 (2013.01); G06T 7/0032 (2013.01); G06T 2207/20064 (2013.01); G06T 2207/30061 (2013.01); G06T 2207/30096 (2013.01)

(58) Field of Classification Search
None
See application file for complete search history.

(56) References Cited

U.S. PATENT DOCUMENTS

| 5,343,390 | A | * | 8/1994 | Doi ....................... G06F 19/345 378/901 |
| 7,616,789 | B2 |  | 11/2009 | Oosawa |
| 2003/0210813 | A1 |  | 11/2003 | Oosawa |
| 2007/0189594 | A1 |  | 8/2007 | Oosawa |

(Continued)

FOREIGN PATENT DOCUMENTS

JP       2004-41694       2/2004

OTHER PUBLICATIONS

W Zhang, K Doi, ML Giger, Y Wu, RM Nishikawa, and RA Schmidt, "Computerized detection of clustered microcalcifications in digital mammograms using a shift-invariant artificial neural network," Medical Physics 21, 517 (1994); doi: 10.1118/1.597177.*
D Tahmoush, "Image similarity to improve the classification of breast cancer images," Algorithms 2009, 2, 1503-1525; doi:10.3390/a2041503.*

(Continued)

Primary Examiner — Matthew Bella
Assistant Examiner — Soo Shin
(74) Attorney, Agent, or Firm — Wenderoth, Lind & Ponack, L.L.P.

(57) ABSTRACT

A diagnostic support apparatus includes a base vector matching unit configured to match test image base vectors used for a base representation of a test image feature quantity of a test image and normal image base vectors used for a base representation of a normal image feature quantity of a normal image, a lesion determination unit configured to determine that the test image includes an image of a lesion site when a difference between a test image base coefficient and a normal image base coefficient is greater than a threshold, the test image base coefficient being a coefficient with which the test feature quantity is transformed to the base representation, and the normal image base coefficient being a coefficient with which the normal feature quantity is transformed to the base representation, and a determination result output unit configured to output a result of the determination by the lesion determination unit.

4 Claims, 19 Drawing Sheets

(56) References Cited

U.S. PATENT DOCUMENTS

| | | | |
|---|---|---|---|
| 2011/0317043 A1* | 12/2011 | On | H04N 5/213 348/241 |
| 2012/0088981 A1* | 4/2012 | Liu | G06K 9/6215 600/300 |
| 2012/0283574 A1* | 11/2012 | Park | G06K 9/46 600/476 |
| 2015/0016728 A1* | 1/2015 | Parthasarathy | G06T 7/0028 382/195 |

OTHER PUBLICATIONS

KS Deepak, NVK Medathati, J Sivaswamy, "Detection and discrimination of disease-related abnormalities based on learning normal cases," Pattern Recognition, vol. 45, pp. 3707-3716, available online Apr. 4, 2012.*

D-Z Tian, M-H Ha, "Applications of Wavelet Transform in Medical Image Processing," Proceedings of the Third International Conference on Machine Learning and Cybernetics, Shanghai, Aug. 26-29, 2004. pp. 1816-1821.*

* cited by examiner

FIG. 2

PRIOR ART

| d1 | d2 | d3 |
|----|----|----|
| d4 | d5 | d6 |
| d7 | d8 | d9 |

FIG. 5

| Image-feature-quantity management number | Method for calculating image feature quantities | Parameter |
|---|---|---|
| 1 | Wavelet transformation Haar | Number of layers: 3 |
| 2 | Wavelet transformation Mexican Hat | Number of layers: 2 |
| 3 | SIFT | |
| 4 | Differences with adjacent pixels | |
| 5 | Landmarks | |
| ... | ... | ... |

(a)

(b)

DIAGNOSTIC SUPPORT APPARATUS AND DIAGNOSTIC SUPPORT METHOD

CROSS REFERENCE TO RELATED APPLICATION

The present application is based on and claims priority of Japanese Patent Application No. 2012-270449 filed on Dec. 11, 2012. The entire disclosure of the above-identified application, including the specification, drawings and claims is incorporated herein by reference in its entirety.

FIELD

One or more exemplary embodiments disclosed herein relate generally to a diagnostic support apparatus and method that support image-based diagnosis by doctors.

BACKGROUND

In order to support image-based diagnosis by doctors, there have conventionally been proposed apparatuses in which a test image, which is a medical image of a subject to be tested, and normal images, which are medical images of normal structures, are each represented by shape vectors, and the shape vectors of the test image are compared with the shape vectors of the normal images so as to determine the presence or absence of a lesion site (see Patent Literature 1, for example).

CITATION LIST

Patent Literature

[PTL 1]
Japanese Unexamined Patent Application Publication No. 2004-41694

SUMMARY

Technical Problem

With the conventional apparatuses, however, if different methods are used to describe or calculate the shape vectors of normal images and the shape vectors of a test image, it is impossible to accurately determine the presence or absence of a lesion site by simply making a comparison between the shape vectors of the test image and the shape vectors of the normal images. Similar situations can also arise when base vectors used as a basis to represent the image feature quantities of normal images are different from base vectors used as a basis to represent the image feature quantities of a test image.

One or more non-limiting and exemplary embodiments disclosed herein provide a diagnostic support apparatus and method that make it possible to accurately determine the presence or absence of a lesion site without depending on the method for describing or calculating image feature quantities typified by shape vectors.

Solution to Problem

In one general aspect, the techniques disclosed here feature a diagnostic support apparatus that includes a base vector matching unit configured to match base vectors and base vectors, the base vectors being different from the base vectors, the base vectors being used as a basis to represent a test feature quantity that is an image feature quantity of a test image in which presence of an image of a lesion site is unknown, and the base vectors being used as a basis to represent a normal feature quantity that is an image feature quantity of a normal image that does not include an image of a lesion site, a lesion determination unit configured to determine that the test image includes an image of a lesion site when a difference between a coefficient and a coefficient is greater than a determination threshold value, the coefficient being a coefficient with which the test feature quantity is transformed to a base representation, and the coefficient being a coefficient with which the normal feature quantity is transformed to a base representation, and a determination result output unit configured to output a result of the determination by the lesion determination unit.

With this configuration, the base vector matching unit matches the base vectors of the test feature quantity and the base vectors of the normal feature quantity. This allows the diagnostic support apparatus to compare the test feature quantity and the normal feature quantity that cannot be compared as they are due to their different base vectors. Accordingly, it is possible to accurately determine the presence or absence of a lesion site without depending on the method for describing or calculating image feature quantities.

The general and specific aspect disclosed above may be implemented using a system, a method, an integrated circuit, a computer program, a computer-readable recording medium such as a CD-ROM, or any combination thereof.

Additional benefits and advantages of embodiments to be disclosed will be apparent from the Specification and Drawings. The benefits and/or advantages may be individually obtained by various embodiments and features of the Specification and Drawings, which need not all be provided in order to obtain one or more of such benefits and/or advantages.

Advantageous Effects

The diagnostic support apparatus and method according to one or more exemplary embodiments or features disclosed herein make it possible to accurately determine the presence or absence of a lesion site without depending on the method for describing or calculating image feature quantities.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 shows an example of the method for calculating shape vectors.

FIG. 5 illustrates image-feature-quantity management numbers.

Figure 1:
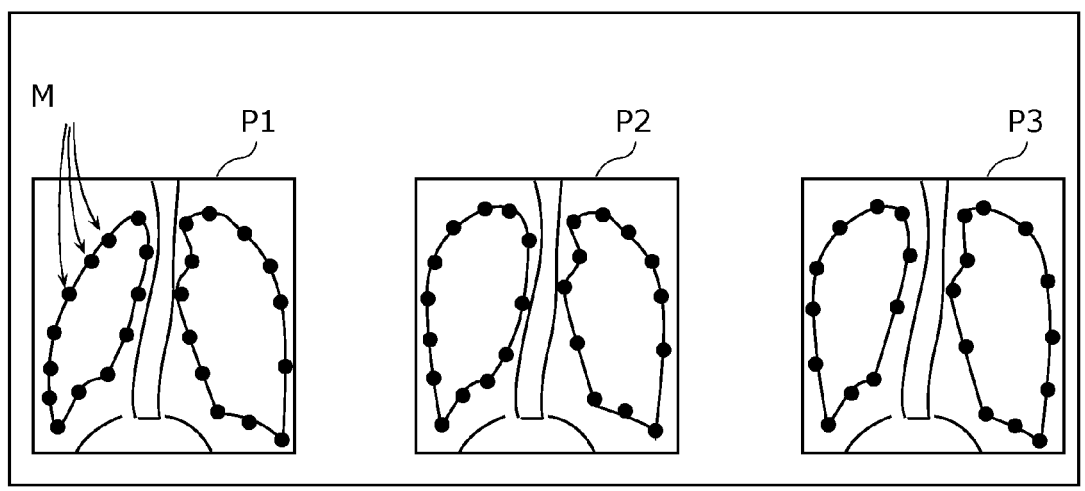
FIG. 1 illustrates a method for setting landmarks disclosed in PTL 1.

DESCRIPTION OF EMBODIMENTS (Underlying Knowledge Forming Basis of the Present Disclosure)

In relation to the conventional apparatuses disclosed in the Background section, the inventors have found the following problem:

Digitization of medical images improves consistency between the medical images and data processing by computers and is increasing opportunities for IT systems to support diagnostic practices by doctors and technicians. One example is computer-aided detection (CAD), which is a method of utilizing computers for detection of a lesion site.

Diagnosticians usually remember medical images of normal structures that include no lesion sites. When a medical image of a subject to be tested, namely a test image, is presented, a diagnostician thinks of medical images of normal structures, namely normal images, and compares the test image with the normal images. When having found a difference between the test image and the normal images, the diagnostician determines that the area of difference is a lesion site. In computer processing, calculating a difference between two pieces of data is a basic function. Thus, image-based diagnosis in which a lesion area is detected by the comparison between a test image and normal images is what the computer processing is good at.

Such difference calculations, however, require alignment between a test image and normal images. To generate the normal images, usually past medical images are used. Specifically, when a diagnostician checks a test image and finds no lesion site in it, the test image is regarded as a normal image. If past test images for a patient include no lesion site, these test images can be used as normal images. However, positions in a test image and corresponding positions in normal images usually do not match even for the same patient due to various factors such as different shooting conditions or changes in the patient's shape. In addition, normal images cannot be obtained when a test image is captured for the first time, because there are no images to be compared. In this case, normal images for other patients are used, but alignment between a test image and the normal images is necessary due to a difference in shape from the other patients.

Incidentally, normal images are generated from images that were captured in the past and have already been checked that no lesions are included. One reason for this is, as described above, that a test image for a patient captured for the first time has no medical images to be compared. The other reason is that medical knowledge tends to be built up by the accumulation of knowledge from past cases and it is more likely that generating normal images having no lesions from past cases will have higher medical utility values. The medical knowledge is making steady improvement, which often improves the interpretation of past cases. Therefore, the medical knowledge registered in IT systems always needs updating, and even normal images are no exceptions.

In view of this, it is desirable to collect normal images for a plurality of patients and generate highly versatile normal images that can comprehensively represent these collected images. One specific example of implementing such generation is representing a normal image as a linear combination of an average shape and an eigen shape as disclosed in PTL 1. In other words, a shape vector x representing a normal image is expressed using Expression 1 below.

$$x = x_{ave} + Ps \cdot bs \quad \text{[Expression 1]}$$

Here, $x_{ave}$ is the average shape vector, Ps is the eigen shape vector, and bs is a set of shape coefficients.

The average shape vector $x_{ave}$ and the eigen shape vector Ps are necessary for the calculation of Expression 1, and landmarks M as shown in FIG. 1 are set in an image to vectorize image information. The landmarks M are indicated by black dots in FIG. 1. The x and y coordinates of the landmarks M serve as vector elements and are used to vectorize image information. As shown in test images P1, P2, and P3, landmarks are individually set in a plurality of normal images, a shape vector is defined, and the landmarks and the shape vector are used to calculate an average vector and an eigen vector. Note that a test image can also be expressed in a similar manner, using Expression 1.

Using the vectors described above, a test image and normal images are aligned and a lesion site is detected from a difference between the test image and the normal images. This supports image-based diagnosis.

Figure 2:
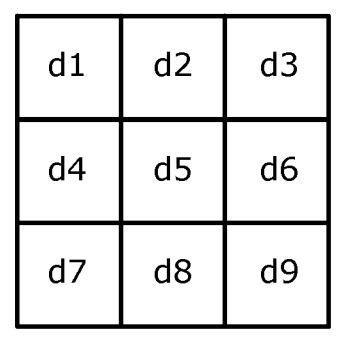

With the conventional technique, however, if different methods are used to represent shape vectors between a test image and normal images, compatibility with the normal images expressed using Expression 1 will be lost. For example, if the number of landmarks differs between a test image and normal images, the number of dimensions of shape vectors will differ. Here, shape vectors can be represented using different calculation methods other than the calculation method using landmarks. For example, it is possible, as shown in FIG. 2, to represent a shape vector as a 9-dimensional vector consisting of differences in pixel values between a center pixel and each of the eight pixels adjacent to the center pixel. In FIG. 2, if dx (x=1 to 9) denotes the pixel value, the aforementioned 9-dimensional vector can be represented as (d5, d5-d1, d5-d2, d5-d3, d5-d4, d5-d6, d5-d7, d5-d8, d5-d9). Shape vectors represented using such a method are different from shape vectors consisting of the x and y coordinates of landmarks. It is also conceivable to calculate shape vectors using widely available encoding systems such as wavelet transformation.

One or more exemplary embodiments disclosed herein provide a diagnostic support apparatus and method that make it possible to accurately determine the presence or absence of a lesion site even if different methods are used to describe or calculate image feature quantities typified by shape vectors.

According to an exemplary embodiment disclosed herein, the diagnostic support apparatus includes a base vector matching unit configured to match base vectors and base vectors, the base vectors being different from the base vectors, the base vectors being used as a basis to represent a test feature quantity that is an image feature quantity of a test image in which presence of an image of a lesion site is unknown, and the base vectors being used as a basis to represent a normal feature quantity that is an image feature quantity of a normal image that does not include an image of a lesion site, a lesion determination unit configured to determine that the test image includes an image of a lesion site when a difference between a coefficient and a coefficient is greater than a determination threshold value, the coefficient being a coefficient with which the test feature quantity is transformed to a base representation, and the coefficient being a coefficient with which the normal feature quantity is transformed to a base representation, and a determination result output unit configured to output a result of the determination by the lesion determination unit.

Figure 3:
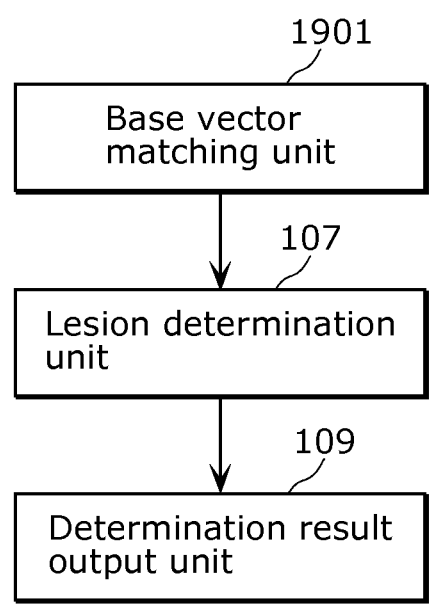
FIG. 3 is a block diagram showing a functional configuration of a diagnostic support apparatus according to one exemplary embodiment.

FIG. 3 is a block diagram showing a functional configuration of the diagnostic support apparatus. The diagnostic support apparatus includes a base vector matching unit 1901, a lesion determination unit 107, and a determination result output unit 109.

With this configuration, the base vector matching unit matches the base vectors of a test feature quantity and the base vectors of a normal feature quantity. This allows the diagnostic support apparatus to compare the test feature quantity and the normal feature quantity that cannot be compared as they are due to their different base vectors. Accordingly, it is possible to accurately determine the presence or absence of a lesion site without depending on the method for describing or calculating image feature quantities.

For example, the base vector matching unit may include a base vector transformation unit configured to, when the test feature quantity and the normal feature quantity match in type, perform transformation processing for matching the base vectors used as a basis to represent the test feature quantity to the base vectors used as a basis to represent the normal feature quantity, and represent the test feature quantity as a linear combination of the base vectors of the normal feature quantity with the coefficient, and the lesion determination unit may be configured to determine that the test image includes an image of a lesion site when the difference between the coefficient with which the normal feature quantity is transformed to a base representation and the coefficient used with the test image base vectors that have undergone the transformation processing is greater than the determination threshold value.

With this configuration, the transformation processing is performed to match the base vectors of the test feature quantity to the base vectors of the normal feature quantity. This allows the diagnostic support apparatus to compare the test feature quantity and the normal feature quantity that cannot be compared as they are due to different methods for describing image feature quantities. Accordingly, it is possible to accurately determine the presence or absence of a lesion site without depending on the method for describing image feature quantities.

For example, the diagnostic support apparatus may further include a normal coefficient storage unit configured to store at least one of the coefficient with which the normal feature quantity is transformed to a base representation, wherein the lesion determination unit is configured to determine that the test image includes an image of a lesion site when a difference between a selected one of the at least one coefficient stored in the normal coefficient storage unit and the coefficient used with the test image base vectors that have undergone the transformation processing is greater than the determination threshold value.

The base vector transformation unit may be further configured to receive a first coefficient from an external apparatus, the first coefficient being a coefficient with which an image feature quantity of a normal image is transformed to a base representation, the image feature quantity being of the same type as the normal feature quantity, to perform transformation processing for matching first base vectors corresponding to the first coefficient with second base vectors corresponding to the at least one coefficient stored in the normal coefficient storage unit, to represent the image feature quantity corresponding to the first coefficient as a linear combination of the second base vectors with a second coefficient, and to add the second coefficient into the normal coefficient storage unit.

With this configuration, the transformation processing for matching base vectors is performed even if the received coefficient corresponds to a normal image represented by base vectors that are different from the base vectors corresponding to the coefficient stored in the normal coefficient storage unit. Accordingly, it is possible to add coefficients corresponding to image feature quantities of normal images into the normal coefficient storage unit without depending on the method for describing image feature quantities.

The diagnostic support apparatus may further include a data reception unit configured to receive first data and second data at different times and combine the received first data and the received second data to restore the base vectors used as a basis to represent the test feature quantity, the first data and the second data being obtained by dividing the base vectors of the test feature quantity.

With this configuration, even if the third party could acquire either the first data or the second data by interception or the like, it is impossible for the third party to restore the base vectors from the acquired first or second data. Thus, even if the third party could acquire a coefficient corresponding to a test feature quantity, the third party cannot restore the test image without having the base vectors. This provides information security.

The diagnostic support apparatus may further include a nearest neighbor detection monitoring unit configured to output an instruction to update the base vectors of the normal feature quantity when the difference between the coefficient with which the normal feature quantity is transformed to a base representation and the coefficient with which the test feature quantity is transformed to a base representation is greater than a reference value.

With this configuration, it is possible to update the base vectors of normal feature quantities when input of an unexpected test image produces a considerable difference between a test feature quantity and a normal feature quantity.

The base vector matching unit may include a pixel value transformation unit configured to, when the test feature quantity and the normal feature quantity do not match in type, transform the test feature quantity to a pixel value to restore the test image, an image feature quantity calculation unit configured to calculate an image feature quantity of the same type as the normal feature quantity from the restored test image, and a base representation unit configured to represent the image feature quantity calculated by the image feature quantity calculation unit as a linear combination of the base vectors, with which the normal feature quantity is transformed to a base representation, with a coefficient. The lesion determination unit may be configured to determine that the test image includes an image of a lesion site when a difference between the coefficient with which the normal feature quantity is transformed to a base representation and the coefficient used by the base representation unit to represent the calculated image feature quantity is greater than the determination threshold value.

With this configuration, when different methods for calculating image feature quantities are used between a test image and normal images, a test image is restored from the image feature quantities of the test image, and then new image feature quantities are calculated from the restored image using the same calculation method as that used to calculate the normal feature quantities. Accordingly, it is possible to determine the presence or absence of a lesion site without depending on the method for calculating image feature quantities.

For example, the diagnostic support apparatus may further include a normal coefficient storage unit configured to store at least one of the coefficient with which the normal feature quantity is transformed to a base representation, wherein the pixel value transformation unit is further configured to receive an image feature quantity of a normal image from an external apparatus and transform the received image feature quantity to a pixel value to restore the normal image, the image feature quantity being of a different type from the normal feature quantity, the image feature quantity calculation unit is further configured to calculate an image feature quantity of the same type as the normal feature quantity from the restored normal image, and the base representation unit is further configured to represent the image feature quantity calculated by the image feature quantity calculation unit as a linear combination of the base vectors, with which the normal feature quantity is transformed to a base representation, with a coefficient, and to add the coefficient into the normal coefficient storage unit.

With this configuration, even if the received image feature quantities of a normal image have been calculated using a different method from that used to calculate the normal feature quantities corresponding to the coefficients stored in the normal coefficient storage unit, the normal image can be restored from the received image feature quantities, and then new image feature quantities are calculated from the restored normal image using the same method as that used to calculate the normal feature quantities. Accordingly, it is possible to add coefficients of the image feature quantities of normal images into the normal coefficient storage unit without depending on the method for calculating image feature quantities.

The diagnostic support apparatus may further include an image feature quantity transformation unit configured to transform the coefficient, with which the normal feature quantity is transformed to a base representation, to the normal feature quantity, wherein the base representation unit is configured to calculate base vectors from the normal feature quantity transformed by the image feature quantity transformation unit and the image feature quantity calculated by the image feature quantity calculation unit, and to represent each of the transformed normal feature quantity and the calculated image feature quantity as a linear combination of the calculated base vectors with a coefficient.

With this configuration, when different methods for calculating image feature quantities are used between a test image and normal images, the test image is restored from the image feature quantities of the test image, and new image feature quantities are calculated from the restored image using the same method as that used to calculate the normal feature quantities. Also, each of the normal feature quantities and the image feature quantities of the restored test image can be represented using coefficients of the base vectors calculated from the normal feature quantities and the image feature quantities of the restored test image. This allows the diagnostic support apparatus to compare the image feature quantities of a test image and the image feature quantities of normal images. Accordingly, it is possible to accurately determine the presence or absence of a lesion site without depending on the method for calculating image feature quantities.

The diagnostic support apparatus may further include a normal coefficient storage unit configured to store at least one of the coefficient with which the normal feature quantity is transformed to a base representation, wherein the pixel value transformation unit is further configured to receive an image feature quantity of a normal image from an external apparatus and transform the received image feature quantity to a pixel value to restore the normal image, the image feature quantity being of a different type from the normal feature quantity, the image feature quantity calculation unit is further configured to calculate an image feature quantity of the same type as the normal feature quantity from the restored normal image, and the base representation unit is further configured to calculate base vectors from the normal feature quantity transformed by the image feature quantity transformation unit and the image feature quantity calculated by the image feature quantity calculation unit, to represent the calculated image feature quantity as a linear combination of the calculated base vectors with a coefficient, and to add the coefficient into the normal coefficient storage unit.

With this configuration, even if the received image feature quantities of a normal image have been calculated using a different method from that used to calculate the normal feature quantities corresponding to the coefficients stored in the normal coefficient storage unit, the normal image can be restored from the received image feature quantities, and new image feature quantities are calculated from the restored normal image using the same method as that used to calculate the normal feature quantities. Also, each of the normal feature quantities and the image feature quantities of the restored normal images can be represented using coefficients of the base vectors calculated from the normal feature quantities and the image feature quantities of the restored normal images. Accordingly, it is possible to add coefficients of image feature quantities of normal images into the normal coefficient storage unit without depending on the method for calculating image feature quantities.

These general and specific aspects may be implemented using a system, a method, an integrated circuit, a computer program, a computer-readable recording medium such as a CD-ROM, or any combination thereof.

Hereinafter, exemplary embodiments are described in more detail with reference to the accompanying drawings.

Exemplary embodiments described below show general or specific examples. The numerical values, shapes, materials, structural elements, the arrangement and connection of the structural elements, steps, the processing order of the steps etc. shown in the following exemplary embodiments are merely examples and do not limit the scope of the appended Claims and their equivalents. Therefore, among the structural elements in the following exemplary embodiments, structural elements that are not recited in any one of the independent claims are described as arbitrary structural elements.

Embodiment 1

The present embodiment describes a diagnostic support apparatus that shares image-feature-quantity management numbers with a plurality of facilities, the image-feature-quantity management numbers being numbers for identifying methods for calculating image feature quantities, thus making it possible to detect a lesion site without depending on different methods for calculating image feature quantities.

Figure 4:
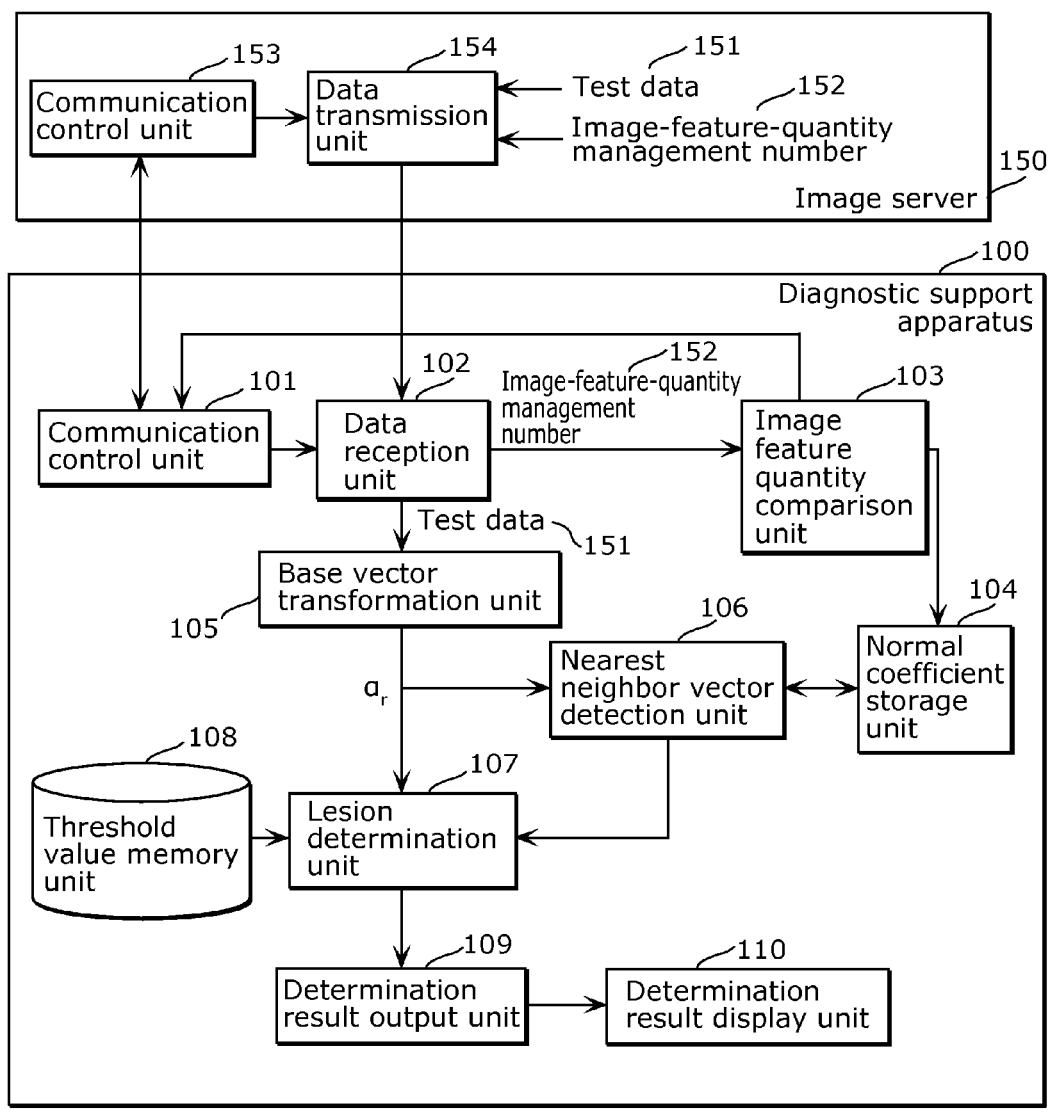
FIG. 4 is a block diagram showing functional configurations of a diagnostic support apparatus and an image server according to Embodiment 1.

FIG. 4 is a block diagram showing functional configurations of a diagnostic support apparatus 100 and an image server 150 according to Embodiment 1.

The image server 150 is configured to transmit test data 151 for testing a patient and an image-feature-quantity management number 152 to the diagnostic support apparatus 100. The test data 151 includes image feature quantities of a test image for the patient. The test data 151 also includes base vectors used as a basis to represent the test image, and base coefficient vectors. The image-feature-quantity management number 152 is the number to identify the method used to calculate the image feature quantities of the test image.

The diagnostic support apparatus 100 is configured to receive the test data 151 and the image-feature-quantity management number 152 from an image server 150, which is installed in a facility different from the facility in which the diagnostic support apparatus 100 is installed, and to detect a lesion site on the basis of the test data 151, the lesion site being an area of difference between the test image and normal images.

The diagnostic support apparatus 100 includes a communication control unit 101, a data reception unit 102, an image feature quantity comparison unit 103, a normal coefficient storage unit 104, a base vector transformation unit 105, a nearest neighbor vector detection unit 106, the lesion determination unit 107, a threshold value memory unit 108, the determination result output unit 109, and a determination result display unit 110.

The image server 150 includes a communication control unit 153 and a data transmission unit 154.

The communication control unit 101 is configured to notify the image server 150 that the diagnostic support apparatus 100 will receive the test data 151 and the image-feature-quantity management number 152 from the image server 150. The communication control unit 101 is also configured to notify the data reception unit 102 that the data reception unit 102 will receive the test data 151 and the image-feature-quantity management number 152.

The image-feature-quantity management number 152 is assigned to each method for calculating image feature quantities for convenience as shown in FIG. 5. The diagnostic support apparatus 100 and the image server 150 use common image-feature-quantity management numbers 152.

When the image-feature-quantity management number 152 is 1, the method for calculating image feature quantities is wavelet transformation using the Haar kernel. The number of layers of the wavelet transformation is three.

When the image-feature-quantity management number 152 is 2, the method for calculating image feature quantities is wavelet transformation using the Mexican Hat kernel. The number of layers of the wavelet transformation is two.

When the image-feature-quantity management number 152 is 3, the method for calculating image feature quantities is scale-invariant feature transform (SIFT).

When the image-feature-quantity management number 152 is 4, the method for calculating image feature quantities is the operation of calculating differences between a pixel of interest and pixels adjacent to the pixel of interest.

When the image-feature-quantity management number 152 is 5, the image feature quantities are represented by the image coordinates of a plurality of landmarks as in PTL 1.

Note that although, in this exemplary operation, the communication control unit 153 of the image server 150 instructs the data transmission unit 154 to transmit the test data 151 and the image-feature-quantity management number 152, one or more exemplary embodiments disclosed herein are not intended to limit the configuration and operations of the image server 150.

The data reception unit 102 is configured to, upon receipt of the test data 151 and the image-feature-quantity management number 152 from the image server 150, transfer the test data 151 to the base vector transformation unit 105 and transfer the image-feature-quantity management number 152 to the image feature quantity comparison unit 103.

The image feature quantity comparison unit 103 is configured to hold the image-feature-quantity management number for the image feature quantities (coefficients) of normal images stored in the normal coefficient storage unit 104 and to compare the image-feature-quantity management number 152 received from the image server 150 with the stored image-feature-quantity management number for matching. When the image-feature-quantity management number 152 does not match the stored image-feature-quantity management number, the image feature quantity comparison unit 103 notifies the communication control unit 101 that the image-feature-quantity management numbers do not match. In response to this, the communication control unit 101 requests the image server 150 to stop the transmission of data.

The normal coefficient storage unit 104 is configured to hold base coefficient vectors of normal images.

The base coefficient vectors of normal images are represented as a matrix by the following expression:

$$\alpha_p = B^{-1}(f_p - g) \Leftrightarrow \begin{pmatrix} \alpha_{p,1} \\ \alpha_{p,2} \\ \vdots \\ \alpha_{p,n} \end{pmatrix} = \qquad \text{[Expression 2]}$$

$$(b_1 \ b_2 \ \ldots \ b_n)^{-1}(f_p - g) \Leftrightarrow \begin{pmatrix} \alpha_{p,1} \\ \alpha_{p,2} \\ \vdots \\ \alpha_{p,n} \end{pmatrix} =$$

$$\begin{pmatrix} b_{1,1} & b_{2,1} & \ldots & b_{n,1} \\ b_{1,2} & b_{2,2} & \ldots & b_{n,2} \\ \vdots & \vdots & \vdots & \vdots \\ b_{1,n} & b_{2,n} & \ldots & b_{n,n} \end{pmatrix}^{-1} \begin{pmatrix} f_{p,1} - g_1 \\ f_{p,2} - g_2 \\ \vdots \\ f_{p,n} - g_n \end{pmatrix}$$

Here, the matrix B represents a normal structural base vector matrix, and the vector g represents an average normal structural vector, both of which will be described later. Expression 2 is obtained by solving Expression 1 for a shape coefficient set bs. The correspondence between Expression 1 and Expression 2 is as follows:

Shape Vector x ⇔ Normal Image Feature Quantity Vector $f_p$

Average Shape Vector $x_{ave}$ ⇔ Average Normal Structural Vector g

Eigen Shape Vector Ps ⇔ Normal Structural Base Vector Matrix B

Shape Coefficient Set bs ⇔ Normal Image Base Coefficient Vector $\alpha_p$

Figure 6:
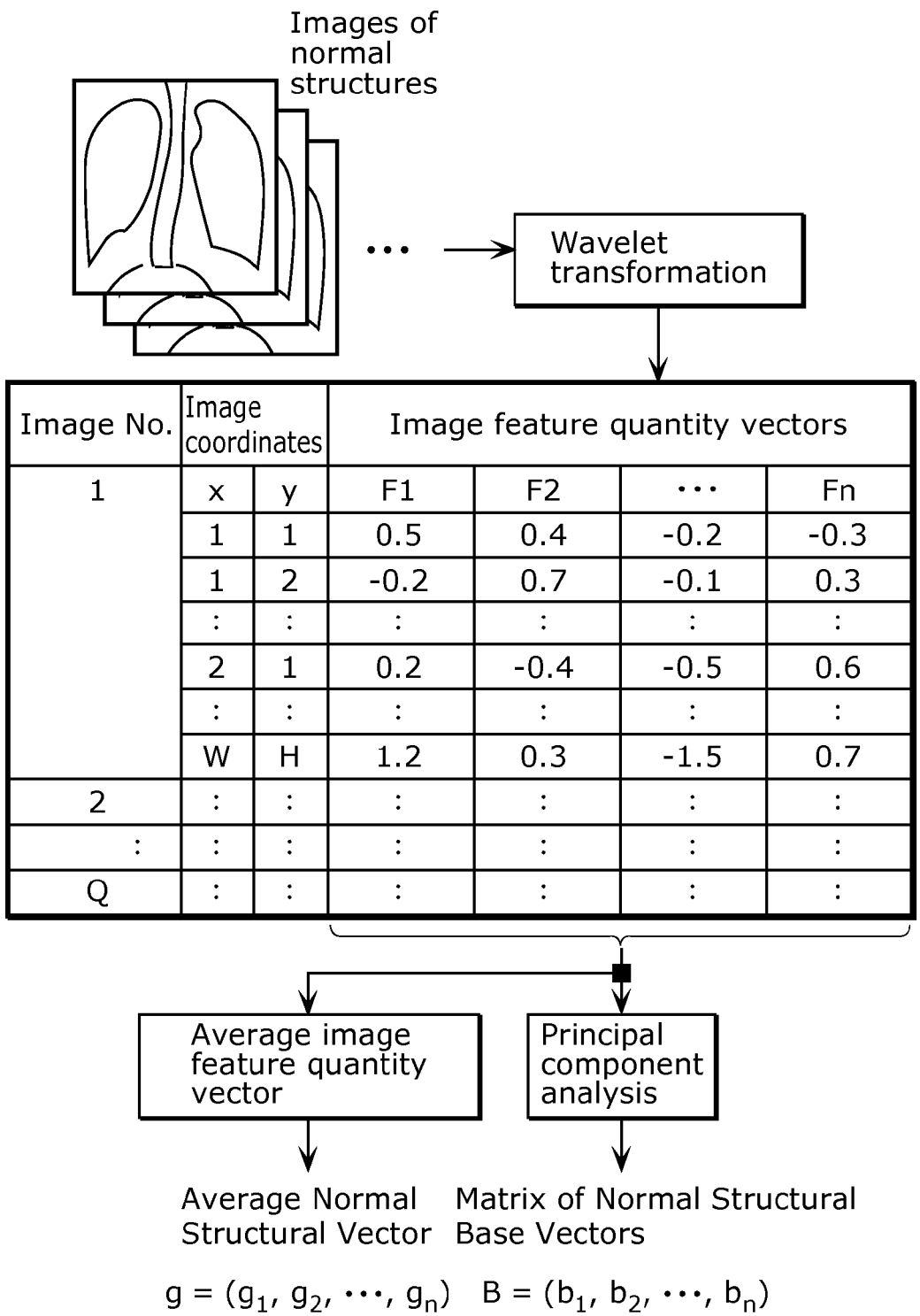
FIG. 6 illustrates a method for calculating base vectors and average vectors for normal structures.

The normal structural base vector matrix B and the average normal structural vector g are calculated on the basis of the image feature quantity vectors calculated from a large number of normal images as shown in FIG. 6. If, for example, W is the width of normal images and H is the height of the normal images, (W×H) image feature quantity vectors are calculated from a single normal image. Assuming that Q is the number of normal images, (W×H×Q) image feature quantity vectors are obtained from Q normal images. The number of dimensions of each image feature quantity vector is assumed to be n.

The image feature quantities are calculated through wavelet transformation, for example.

Figure 7:
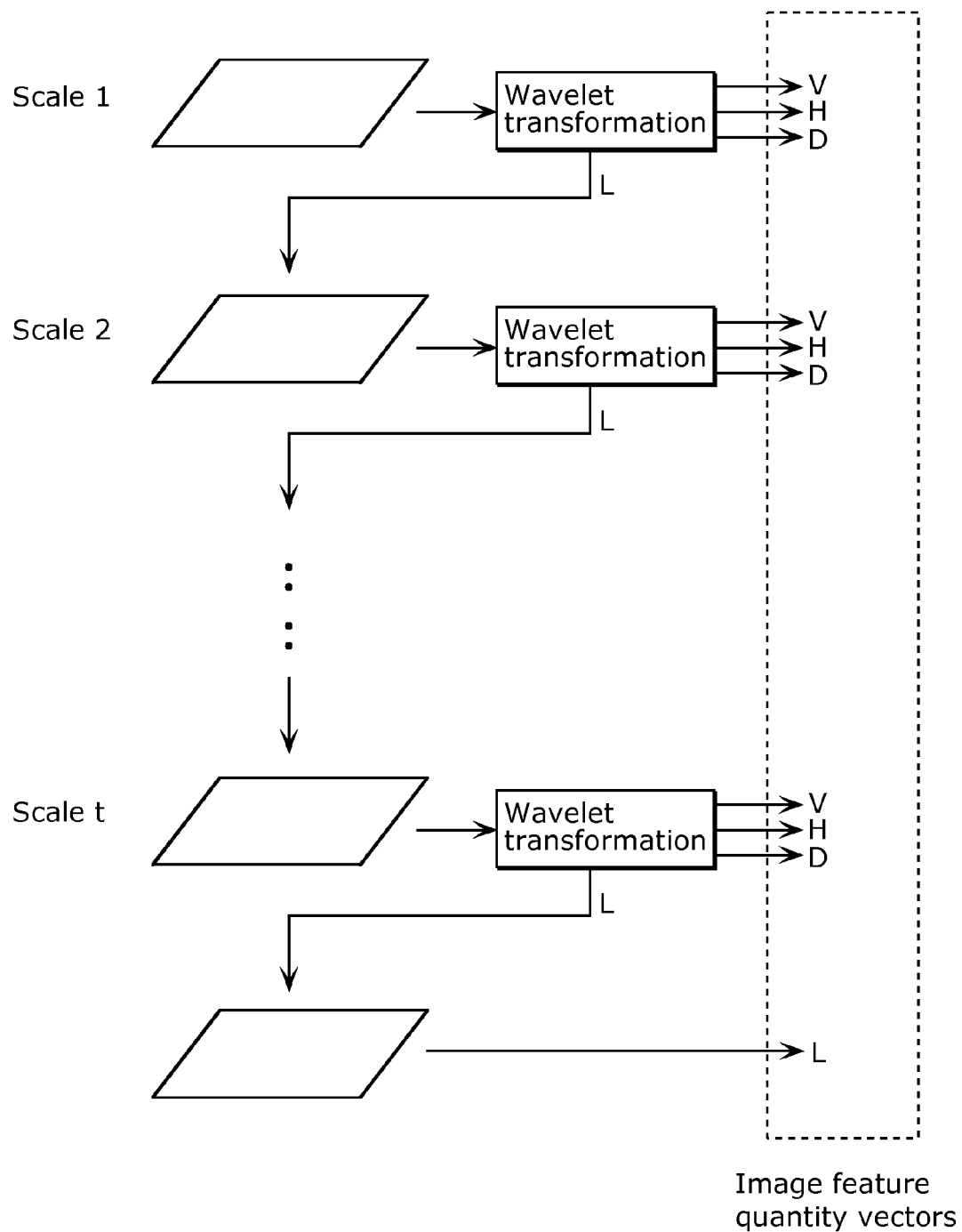
FIG. 7 shows an example of calculation of an image feature quantity vector through wavelet transformation.

FIG. 7 shows multiresolution representation of an image in t scales through the wavelet transformation. In scale 1, differences in luminance between a pixel of interest and pixels adjacent to the pixel of interest are calculated, and smoothing is performed for every given number of pixels at the time of transition to scale 2. In scale 2, differences in luminance between a pixel of interest and pixels adjacent to the pixel of interest are also calculated. It is noted here that each pixel of scale 2 is obtained by smoothing a plurality of pixels of scale 1 and accordingly has a lower frequency component. Therefore, carrying out the calculations from scale 1 to scale t (t is an integer of 2 or more) yields wavelet coefficients V, H, and D of each scale with gradual transition from high frequency components to low frequency components. Each image feature quantity vector consists of the wavelet coefficients V, H, and D calculated in each scale and an average luminance value L calculated from the image of scale t, and thus has (3t+1) dimensions.

Figure 8:
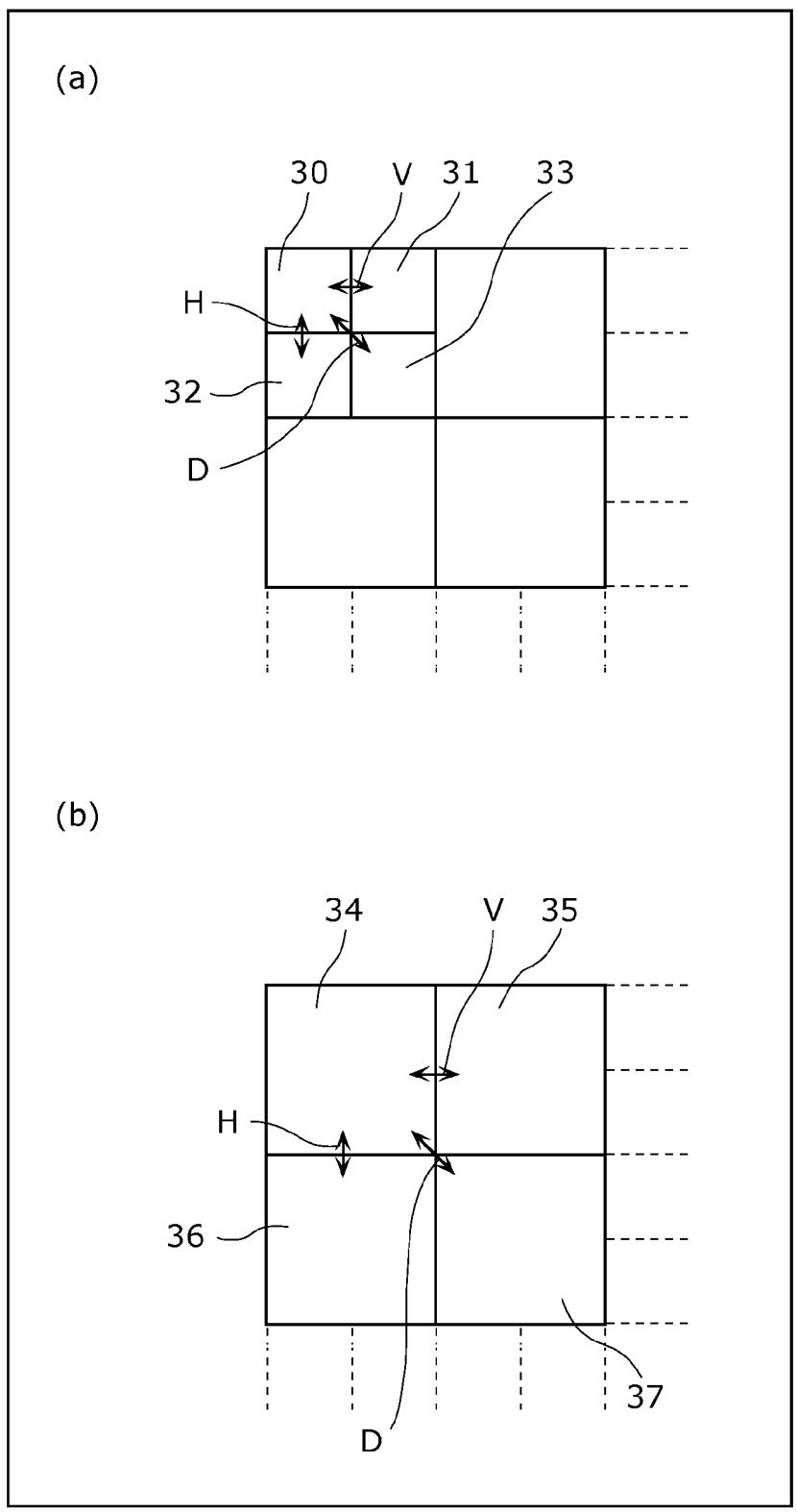
FIG. 8 shows an example of calculation of wavelet coefficients using Haar mother wavelet transform.

In the case of using Haar mother wavelet transform, as shown in (a) in FIG. 8, V is the value of luminance difference between a pixel of interest 30, which is a pixel to be processed, and a right adjacent pixel 31, H is the value of luminance difference between the pixel of interest 30 and a bottom adjacent pixel 32, D is the value of luminance difference between the pixel of interest 30 and a lower-right diagonally adjacent pixel 33, and L is the average value of the luminance values of the above four pixels, namely, the pixel of interest 30, the right adjacent pixel 31, the bottom adjacent pixel 32, and the lower-right diagonally adjacent pixel 33. In FIG. 8, (a) corresponds to scale 1, and (b) corresponds to scale 2. The image of scale 2 is an image in which each pixel has an average luminance value of four pixels in the image of scale 1. In other words, the average luminance value of four pixels in the image of scale 1, i.e., the output L, is the luminance value of each block of scale 2 for which the luminance difference value is calculated. An output V in scale 2 is the value of luminance difference between a block 34 and a right adjacent block 35. An output H in scale 2 is the value of luminance difference between the block 34 and a bottom adjacent block 36. An output D in scale 2 is the value of luminance difference between the block 34 and a lower-right adjacent block 37. The output L in scale 2 is an average luminance value of the above four blocks, namely, the block 34, the right adjacent block 35, the bottom adjacent block 36, and the lower-right adjacent block 37.

While the present embodiment describes the image feature quantity vectors using the wavelet coefficients, one or more exemplary embodiments disclosed herein are not limited to this example, and any image feature quantities can be used. Examples of the image feature quantities include SIFT feature quantities, higher order local autocorrelation (HLAC) feature quantities, and histograms-of-oriented-gradients (HOG) feature quantities.

The average normal structural vector g is obtained by calculating an average value for each element of the image feature quantity vectors.

The normal structural base vector matrix B is calculated through principal component analysis as eigen vectors $b_1$, $b_2$, ..., and $b_n$ that are solutions of simultaneous equations given by Expression 3 below.

$$Sb_1 = \lambda_1 b_1 \quad \quad \text{[Expression 3]}$$
$$Sb_2 = \lambda_2 b_2$$
$$\vdots$$
$$Sb_n = \lambda_n b_n$$

Here, the matrix S represents a variance-covariance matrix and is given by Expression 4 below.

$$S = \begin{pmatrix} S_1^2 & S_1 S_2 & \cdots & S_1 S_n \\ S_1 S_2 & S_2^2 & \cdots & S_2 S_n \\ \vdots & \vdots & \ddots & \vdots \\ S_1 S_n & S_2 S_n & \cdots & S_n^2 \end{pmatrix} \quad \text{[Expression 4]}$$

The eigen value $\lambda$ is given by Expression 5 below.

$$\begin{vmatrix} S_1^2 - \lambda & S_1 S_2 & \cdots & S_1 S_n \\ S_1 S_2 & S_2^2 - \lambda & \cdots & S_2 S_n \\ \vdots & \vdots & \ddots & \vdots \\ S_1 S_n & S_2 S_n & \cdots & S_n^2 - \lambda \end{vmatrix} = 0 \quad \text{[Expression 5]}$$

It is assumed that n eigen values $\lambda$ are obtained and are respectively denoted by $\lambda_1, \lambda_2, \ldots,$ and $\lambda_n$ in descending order.

The above operations transform the image feature quantity vectors to a base representation and generate the normal image base coefficient vectors $\alpha$.

The base vector transformation unit 105 is configured to transform the directions of the base vectors of the test data 151 by matching the directions with those of the base vectors stored in the normal coefficient storage unit 104.

Figure 9:
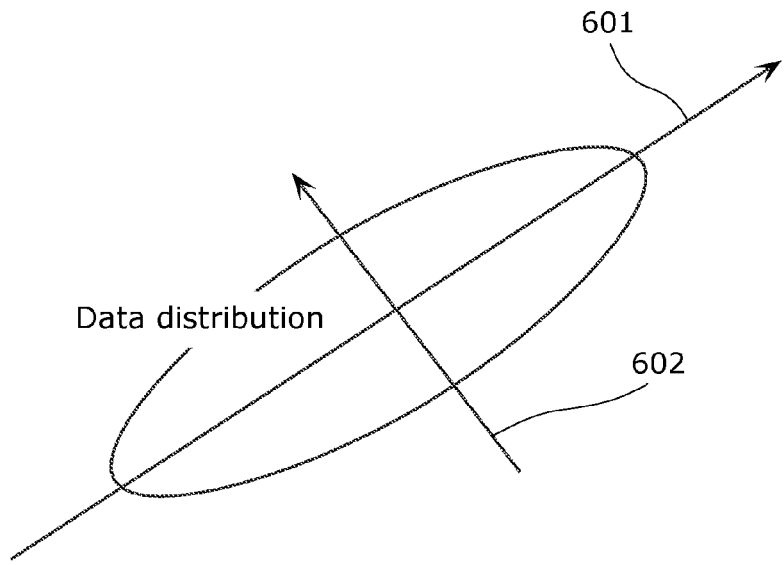
FIG. 9 illustrates the relationships between the directions of base vectors and base coefficient vectors.
Figure 9:
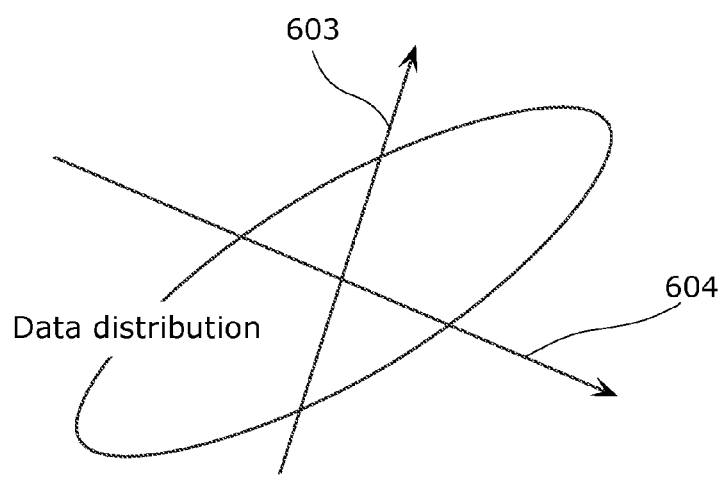

In the base representation, base coefficients for use in representing the same data differ depending on the directions of base vectors. In Expression 5 in which the base vectors are rearranged in descending order, the base vectors are arranged in descending order of proportion. Thus, in the example of the distribution of data as shown in FIG. 9, a first principal component 601 points in the direction of the maximum variance as shown in (a) in FIG. 9. A second principal component 602 is orthogonal to the first principal component 601 and points in the direction of the second maximum variance. On the other hand, it is also possible to obtain principal components having the same variance as shown in (b) in FIG. 9. Specifically, a first principal component 603 and a second principal component 604 have similar widths with respect to an ellipse that represents the distribution of data.

Figure 10:
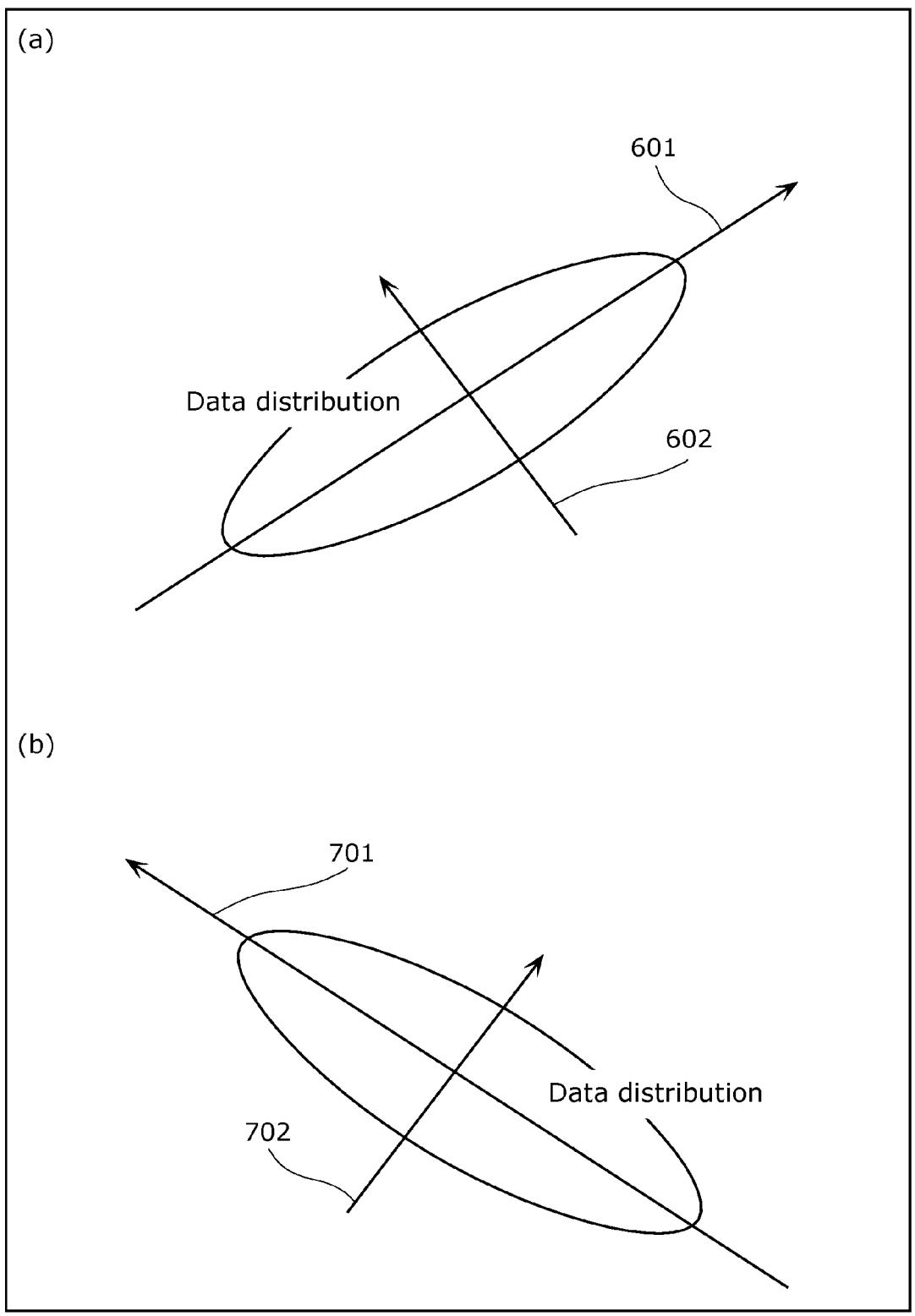
FIG. 10 illustrates the directions of base vectors.

When seen from a different point of view from that in FIG. 9, even if the method for calculating base vectors is fixed to Expression 5, the base vectors to be calculated will vary depending on different distributions of data as shown in (a) and (b) in FIG. 10. In other words, if the distribution of data shown in (a) in FIG. 10, which is the same as that shown in (a)

in FIG. 9, changes to the distribution of data as shown in (b) in FIG. 10, the principal components also change to a first principal component 701 and a second principal component 702 that have different directions.

From the above consideration, it can be found that even if the diagnostic support apparatus 100 and the image server 150 use the same type of image feature quantities, their base vectors can vary depending on the distribution of data. Since there is almost no possibility that test images accumulated day by day in different facilities all match, it is reasonable to consider that the distributions of data do not match due to various factors such as different patients, different diseases, or different imaging devices. It is thus necessary to cope with differences in base vectors as shown in FIG. 10.

The transformation of base vectors can be implemented by replacing the eigen vectors $b_1, b_2, \ldots,$ and $b_n$ of test data with those stored in the normal coefficient storage unit 104 and recalculating the base coefficient vectors of the test data. In other words, the transformation of base vectors can be represented by the following expression:

[Expression 6]

$$\begin{bmatrix} g_{r,1} + b_{r,1,1}\alpha_{r,1} + b_{r,1,2}\alpha_{r,2} + \ldots + b_{r,1,n}\alpha_{r,n} \\ g_{r,2} + b_{r,2,1}\alpha_{r,1} + b_{r,2,2}\alpha_{r,2} + \ldots + b_{r,2,n}\alpha_{r,n} \\ \vdots \\ g_{r,n} + b_{r,n,1}\alpha_{r,1} + b_{r,n,2}\alpha_{r,2} + \ldots + b_{r,n,n}\alpha_{r,n} \end{bmatrix} =$$

$$\begin{bmatrix} g_{s,1} + b_{s,1,1}\alpha_{s,1} + b_{s,1,2}\alpha_{s,2} + \ldots + b_{s,1,n}\alpha_{s,n} \\ g_{s,2} + b_{s,2,1}\alpha_{s,1} + b_{s,2,2}\alpha_{s,2} + \ldots + b_{s,2,n}\alpha_{s,n} \\ \vdots \\ g_{s,n} + b_{s,n,1}\alpha_{s,1} + b_{s,n,2}\alpha_{s,2} + \ldots + b_{s,n,n}\alpha_{s,n} \end{bmatrix}$$

Here, the left side represents test data represented by the normal image base vectors in the diagnostic support apparatus 100, with the suffix r. The right side represents test data represented by the base vectors in the image server 150, with the suffix s. The base coefficient vectors $\alpha_r$ on the left side are unknown. Thus, solving Expression 6 for the base coefficient vectors $\alpha_r$ completes the transformation of base vectors. The base vector transformation unit 105 is configured to output the base coefficient vectors $\alpha_r$ as base coefficient vectors represented with the same base vectors as those stored in the normal coefficient storage unit 104.

The lesion determination unit 107 is configured to determine, for each pixel in the test data, the presence or absence of a lesion site on the basis of the distance between the base coefficient vector $\alpha_r$ and a normal image base coefficient vector $\alpha$. In other words, the lesion determination unit 107 is configured to compare the distance between the base coefficient vector $\alpha_r$ and the normal image base coefficient vector $\alpha$ with a determination threshold value. If the calculated distance is greater than the determination threshold value, the lesion determination unit 107 determines that the pixel of interest from which the base coefficient vector $\alpha_r$ has been calculated is a pixel in a lesion site, and if the distance is less than or equal to the determination threshold value, the lesion determination unit 107 determines that the pixel of interest is a pixel in a normal site. Note that the determination threshold value used to determine the presence or absence of a lesion is calculated from past cases and is stored in advance in the threshold value memory unit 108.

Figure 11:
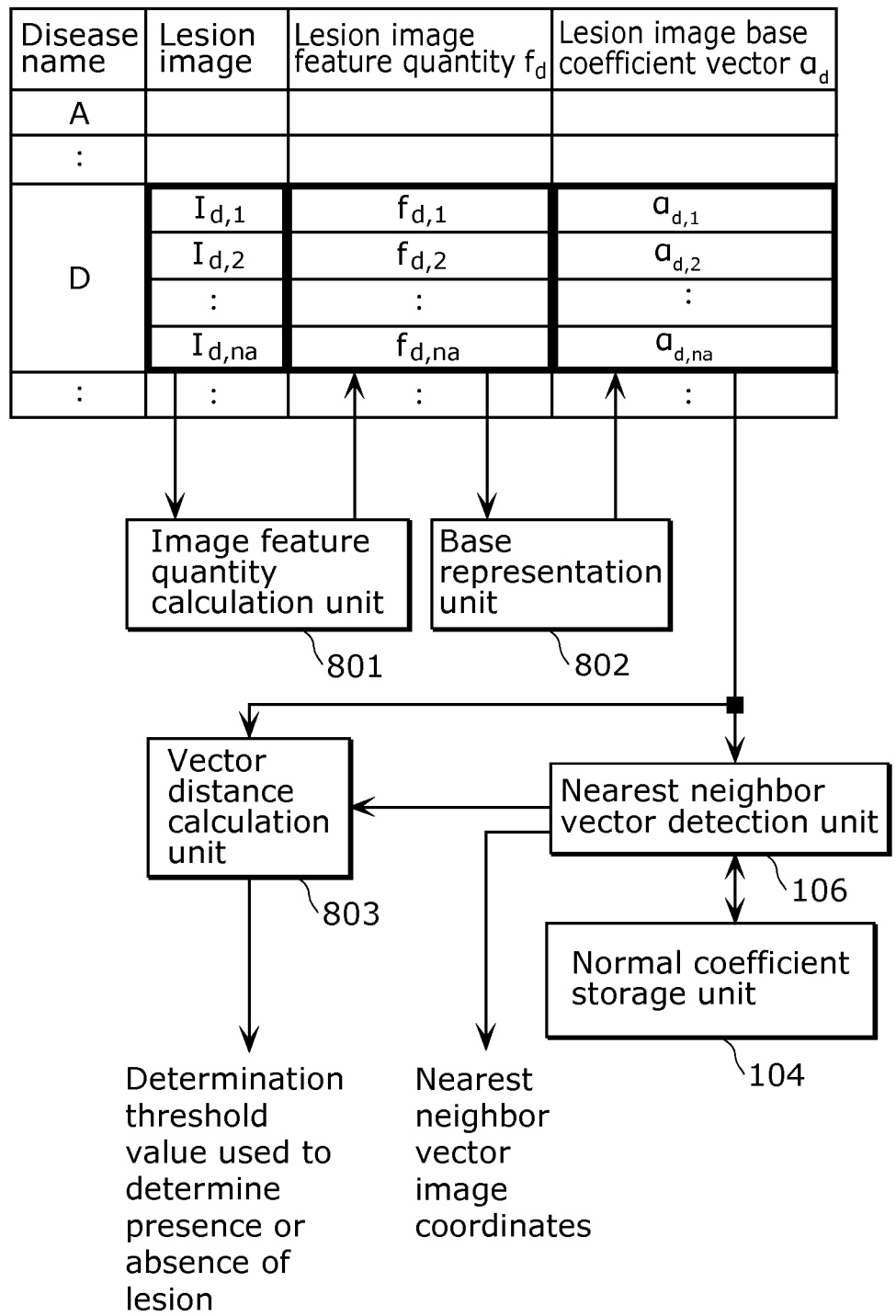
FIG. 11 shows an example of the method for determining a determination threshold value for use in determining the presence or absence of a lesion.

FIG. 11 shows an example of the method for determining the determination threshold value used to determine the presence or absence of a lesion. The determination threshold value is determined by a determination-threshold-value deciding apparatus that includes an image feature quantity calculation unit 801, a base representation unit 802, the nearest neighbor vector detection unit 106, the normal coefficient storage unit 104, and a vector distance calculation unit 803.

First, lesion images in which the presence of a lesion site has been confirmed are acquired from past cases and are classified by the disease name. Next, the image feature quantity calculation unit 801 calculates, for example, a plurality of image feature quantities for each set of image coordinates (for each pixel) in lesion images $I_d$ classified under a disease name D and generates a lesion image feature quantity vector $f_d$ ($f_{d,2}$ to $f_{d,na}$) having the calculated image feature quantities as its vector elements. The lesion image feature quantity vector $f_d$ is generated for each pixel. The base representation unit 802 substitutes the lesion image feature quantity vector $f_d$ into the vector $f_p$ of Expression 2 to transform the lesion image feature quantity vector $f_d$ to a vector $\alpha_p$. This vector $\alpha_p$ is referred to as a lesion image base coefficient vector $\alpha_d$. Then, the nearest neighbor vector detection unit 106 detects a normal image base coefficient vector $\alpha$ that is most similar to the lesion coefficient vector $\alpha_d$ from among the normal image base coefficient vectors $\alpha$ stored in the normal coefficient storage unit 104. For example, a normal image base coefficient vector $\alpha$ having the shortest distance from the lesion image base coefficient vector $\alpha_d$ is detected. The vector distance calculation unit 803 calculates the distance between the detected nearest neighbor normal image base coefficient vector $\alpha$ and the lesion image base coefficient vector $\alpha_d$ and determines the calculated distance as a determination threshold value used to determine the presence or absence of a lesion. It is, however, noted that since there are a large number of lesion images classified under the same disease name, it is more appropriate to, for example, determine an average or median value of determination threshold values calculated from each pixel in each lesion site as the determination threshold value.

While, in FIG. 11, lesion images are classified by the disease name, it is also possible to calculate a determination threshold value for determining the condition of a disease if lesion images are classified by the condition of each disease, using, for example, findings attached to the lesion images. For example, lesion images of tumors are divided into two categories, namely lesion images of benign tumors and lesion images of malignant tumors, and a determination threshold value is obtained for each category of the lesion images. Using these two determination threshold values, the lesion determination unit 107 can determine the condition of the disease as to whether the tumor is benign or malignant.

The determination result output unit 109 is configured to output the result of determination by the lesion determination unit 107 to the determination result display unit 110. The determination result display unit 110 is constituted by a display device or the like and is configured to receive the determination result from the determination result output unit 109, and if the result shows the presence of a lesion site, replace the pixel values of the image coordinates in the lesion site by a specific color (e.g., red or yellow), and display the presence and position of the lesion site as an image.

The determination result output unit 109 is configured to output the result of determination by the lesion determination unit 107.

The determination result display unit 110 is constituted by a display device or the like and is configured to receive the determination result from the determination result output unit 109, and if the result shows the presence of a lesion site, replace the pixel values of the image coordinates in the lesion site by a specific color (e.g., red or yellow), and display the presence and position of the lesion site as an image.

Figure 12:
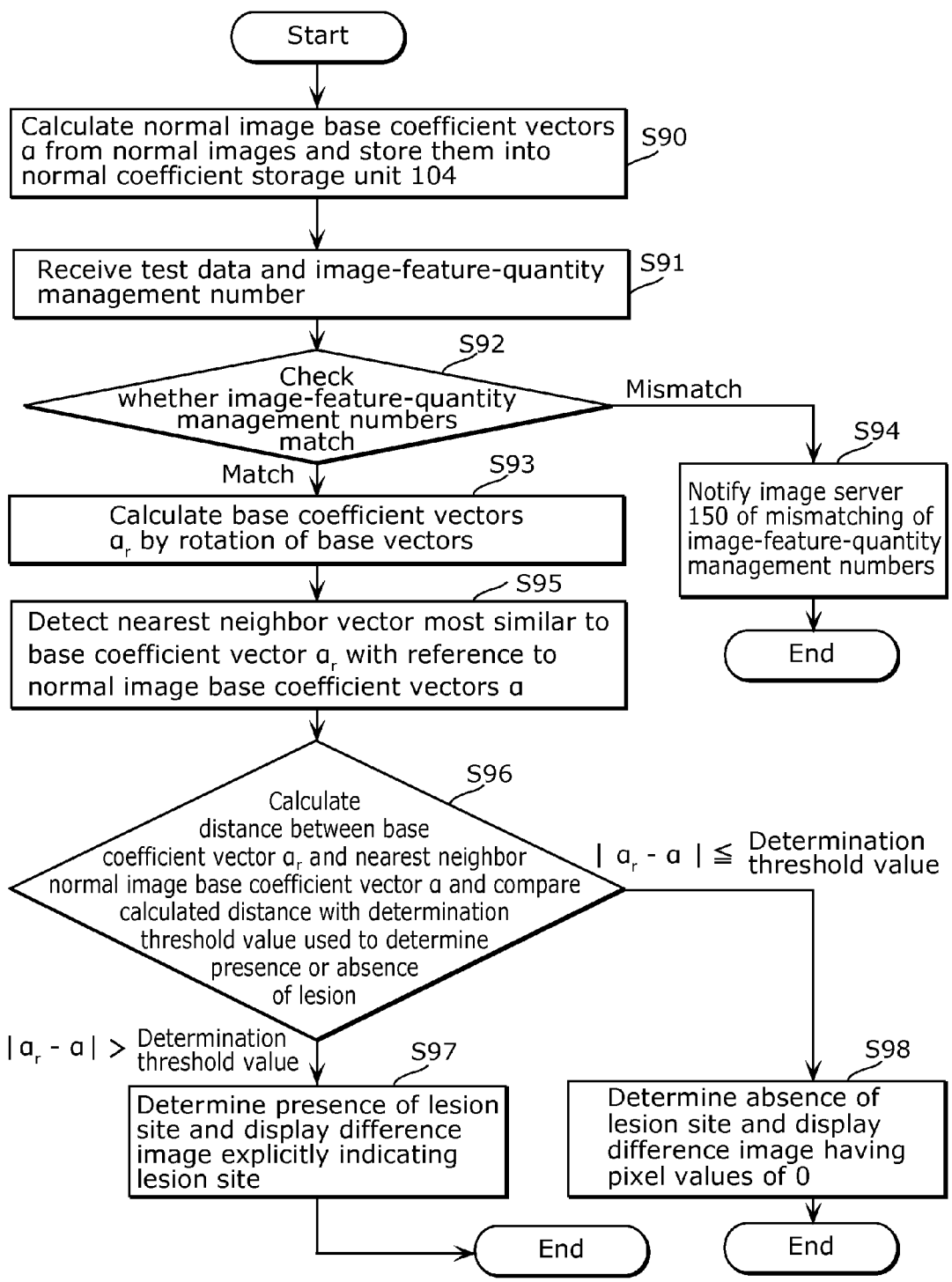
FIG. 12 is a flowchart of processing performed by the diagnostic support apparatus according to Embodiment 1.

FIG. 12 is a flowchart of processing performed by the diagnostic support apparatus 100.

In step S90, prior to the processing for determining the presence or absence of a lesion site, the diagnostic support apparatus 100 stores normal image base coefficient vectors α into the normal coefficient storage unit 104. Specifically, the diagnostic support apparatus 100 calculates base vectors from image feature quantity vectors acquired from a plurality of normal images and then generates the normal image base coefficient vectors α each having, as its vector elements, coefficients used to represent a normal image as a linear combination of these base vectors. The generated normal image base coefficient vectors α are stored into the normal coefficient storage unit 104.

In step S91, the data reception unit 102 receives the test data 151 and the image-feature-quantity management number 152 from the image server 150. The test data 151 includes base vectors used as a basis to represent the image feature quantities of a test image, and base coefficient vectors.

In step S92, the image feature quantity comparison unit 103 compares the image-feature-quantity management number 152 received by the data reception unit 102 with the image-feature-quantity management number of the image feature quantities corresponding to the coefficients stored in the normal coefficient storage unit 104. Through this, the image feature quantity comparison unit 103 checks whether or not the image feature quantities of the test image match the image feature quantities of the normal images. If they match, the procedure proceeds to step S93. It they do not match, the procedure proceeds to step S94, in which the communication control unit 101 notifies the image server 150 that the image feature quantities of the test image do not match the image feature quantities of the normal images.

In step S93, the base vector transformation unit 105 replaces the base vectors of the test data with those stored in the normal coefficient storage unit 104, using Expression 6, so as to calculate base coefficient vectors $\alpha_r$.

In step S95, the nearest neighbor vector detection unit 106 detects a nearest neighbor vector that is most similar to each base coefficient vector $\alpha_r$ with reference to the normal image base coefficients α stored in the normal coefficient storage unit 104.

In step S96, the lesion determination unit 107 calculates, for each pixel in the test image, the distance between the test image base coefficient vector $\alpha_r$ and the nearest neighbor normal image base coefficient vector α and compares the calculated distance with the determination threshold value for use in determining the presence or absence of a lesion.

If the distance between the base coefficient vector $\alpha_r$ and the nearest neighbor normal image base coefficient vector α is greater than the determination threshold value, the procedure proceeds to step S97. In step S97, the lesion determination unit 107 determines the "presence of a lesion site" for the target pixel and outputs the determination result to the determination result output unit 109. Upon receipt of the determination result from the determination result output unit 109, the determination result display unit 110 sets a pixel value of, for example, 1 (white) at the pixel position of the target pixel and displays a difference image that explicitly indicates the lesion site.

On the other hand, if the distance between the base coefficient vector $\alpha_r$ and the nearest neighbor normal image base coefficient vector α is less than or equal to the determination threshold value, the procedure proceeds to step S98. In step S98, the lesion determination unit 107 determines the "absence of a lesion site" for the target pixel and outputs the determination result to the determination result output unit 109. Upon receipt of the determination result from the determination result output unit 109, the determination result display unit 110 sets a pixel value of 0 (black) at the pixel position of the target pixel and displays a difference image.

With the configuration described above, the diagnostic support apparatus 100 can detect a lesion site from the difference between a test image and normal images. According to the present embodiment, the image-feature-quantity management number is used to determine whether or not the image feature quantities of a test image match those of normal images. If they match, the base vectors of the test data 151 are transformed. Thus, even if different base vectors are used at respective facilities, the diagnostic support apparatus 100 can support image-based diagnosis among the facilities. In other words, it is possible to accurately determine the presence or absence of a lesion site without depending on the method for describing or calculating image feature quantities.

Medical images to be accumulated day by data at respective facilities are captured under various conditions such as using different types of diseases, different shapes of patients, different shooting sites, and different settings for imaging devices. Even if the method for calculating image feature quantities is standardized at respective facilities, image feature quantities do not match because image data itself varies. The transformation of base vectors by the diagnostic support apparatus 100 resolves such mismatching of image feature quantities, which occurs as a matter of course, and makes it possible to share normal image data among facilities.

Such a situation where various medical images are acquired can also occur when image data is divided into a plurality of pieces on a time axis. Specifically, in the case where image data is divided into an image data piece captured before time t and an image data piece captured at and after time t, it is not practical to consider that both of the image data pieces reconstitute exactly the same image data. Accordingly, a normal image generated by the image data piece captured before time t and a normal image generated by the image data piece captured at and after time t cannot be associated with each other without transformation of base vectors.

The present embodiment makes it possible to support coordination among various facilities, organizations, or professions such as coordination between a university hospital and community hospitals or coordination between different departments in the same hospital such as between an emergency visit and a clinical department. For example, if the image server 150 shown in FIG. 4 is installed in a community hospital and the diagnostic support apparatus 100 is installed in a university hospital, the support of coordination between these hospitals becomes possible by connecting the diagnostic support apparatus 100 and the image server 150 by the Internet.

Embodiment 2

The present embodiment describes a diagnostic support apparatus that shares image-feature-quantity management numbers among a plurality of facilities and therefore can share the image feature quantities of normal images without depending on different methods for calculating image feature quantities.

Figure 13:
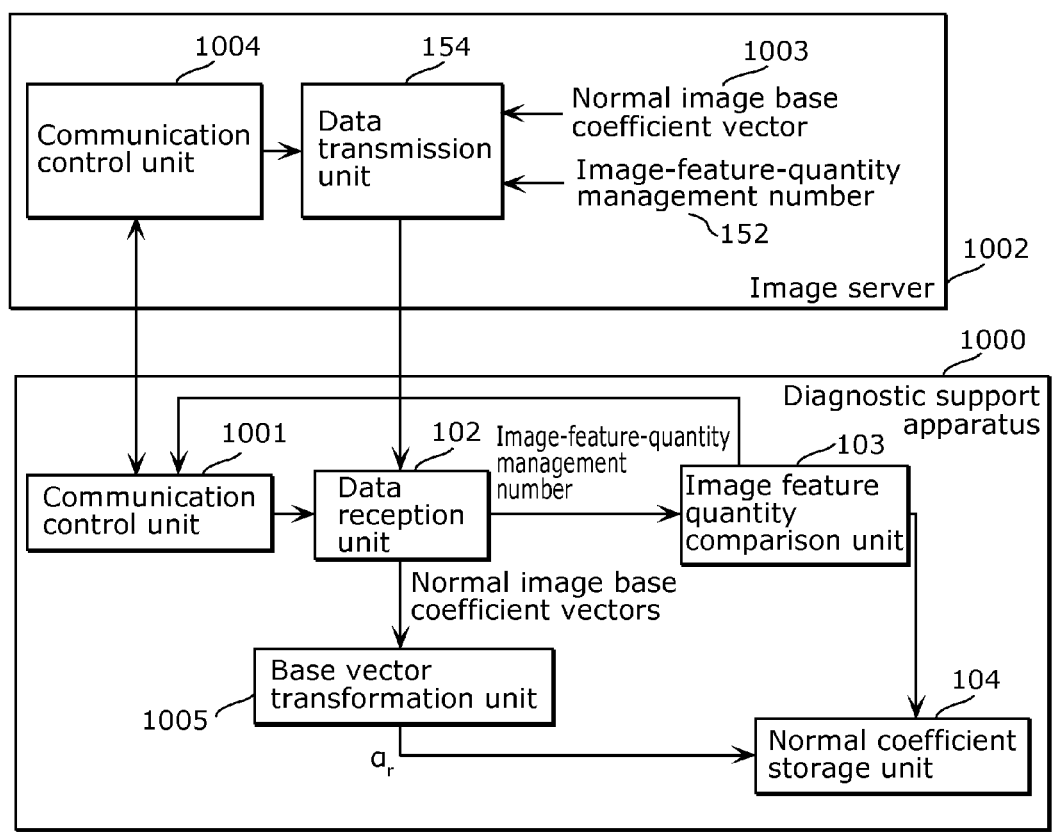
FIG. 13 is a block diagram showing a functional configuration of a diagnostic support apparatus according to Embodiment 2.

FIG. 13 is a block diagram showing a functional configuration of a diagnostic support apparatus 1000 according to Embodiment 2. The diagnostic support apparatus 1000 includes a communication control unit 1001, the data reception unit 102, the image feature quantity comparison unit 103, the normal coefficient storage unit 104, and a base vector transformation unit 1005. Note that structural elements that are the same as those in FIG. 4 are denoted by the same reference numerals and a detailed description thereof will be omitted.

The communication control unit 1001 is configured to notify an image server 1002 that the diagnostic support apparatus 1000 will receive normal image base coefficient vectors 1003 and an image-feature-quantity management number 152 from the image server 1002. The communication control unit 1001 is also configured to notify the data reception unit 102 that the data reception unit 102 will receive the normal image base coefficient vectors 1003 and the image-feature-quantity management number 152. Note that the normal image base coefficient vectors 1003 are base coefficient vectors with which the image feature quantities of normal images are transformed to a base representation.

While, in this operation, a communication control unit 1004 of the image server 1002 instructs a data transmission unit 154 to transmit the normal image base coefficient vectors 1003 and the image-feature-quantity management number 152, one or more exemplary embodiments disclosed herein are not intended to limit the configuration and operations of the image server 1002.

The base vector transformation unit 1005 is configured to transform the directions of base vectors of the image base coefficient vectors 1003 to those of the base vectors stored in the normal coefficient storage unit 104 and to output the resultant base coefficient vectors $\alpha_r$ to the normal coefficient storage unit 104.

The processing described above allows the diagnostic support apparatus 1000 to add normal image base coefficient vectors generated by image servers 1002 installed in other facilities into the normal coefficient storage unit 104. Since the diagnostic support apparatus 1000 determines the presence or absence of a lesion on the basis of a difference between a test image and normal images, the performance in determining the presence or absence of a lesion improves as the variety of normal images stored in the diagnostic support apparatus 100 increases. In addition, higher reliable diagnosis viewing the whole aspect is possible with a greater number of data pieces. The diagnostic support apparatus 1000 is thus capable of storing data in the normal coefficient storage unit 104 without depending on different factors such as different patients' shapes and different image-capturing devices, thus improving the reliability of the lesion detection.

Note that the normal coefficient storage unit 104 storing updated data according to Embodiment 2 is applicable to the diagnostic support apparatus 100 described in Embodiment 1.

Embodiment 3

The present embodiment describes a diagnostic support apparatus that shares image-feature-quantity management numbers among a plurality of facilities and therefore can detect a lesion site without depending on different methods for calculating image feature quantities. In particular, the following describes an embodiment in which when different methods are used to calculate the image feature quantities of a test image and the image feature quantities of normal images, the image feature quantities of the test image are once restored to the pixel values, and then the image feature quantities of the same type as that of the normal images are re-calculated from the pixel values.

Figure 14:
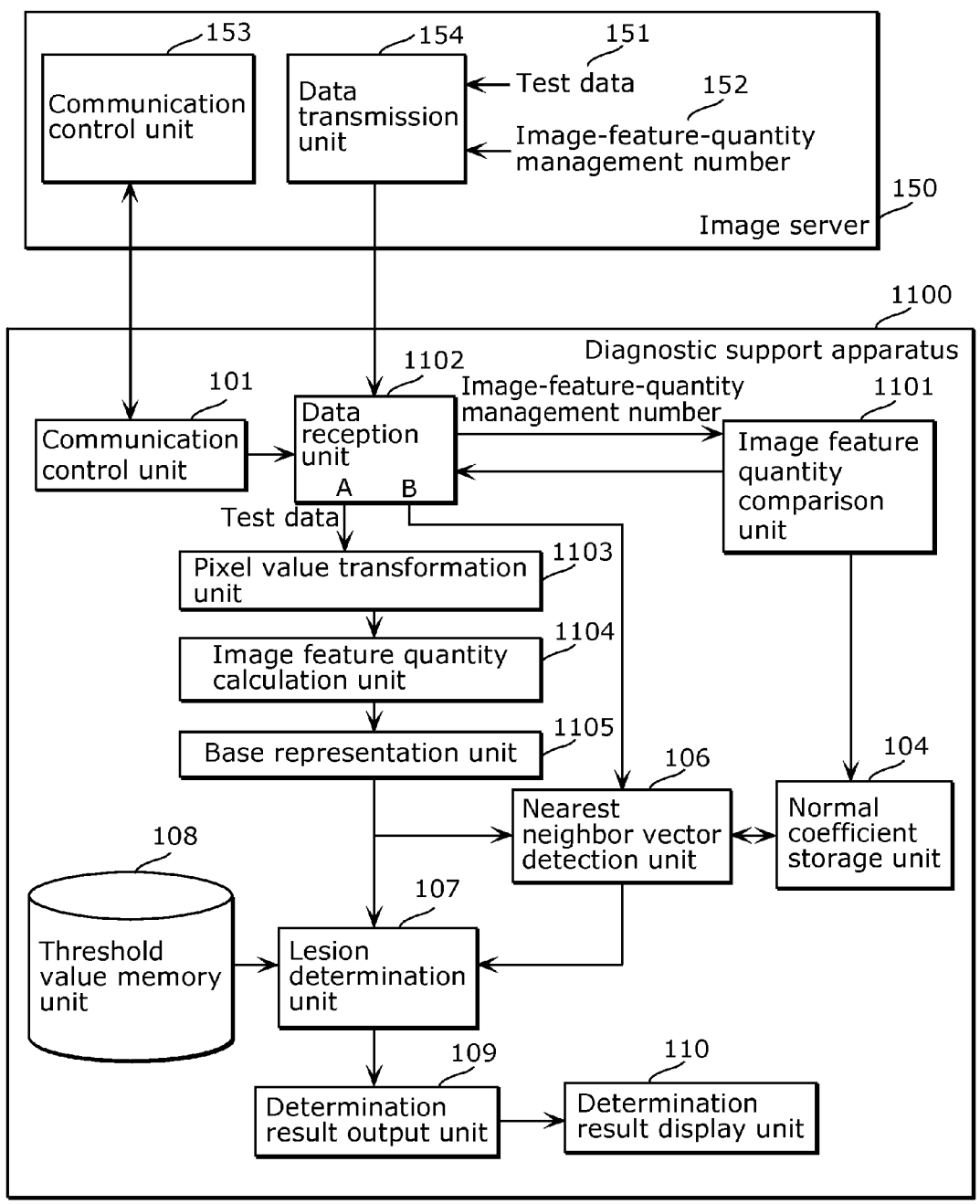
FIG. 14 is a block diagram showing a functional configuration of a diagnostic support apparatus according to Embodiment 3.

FIG. 14 is a block diagram showing a functional configuration of a diagnostic support apparatus 1100 according to Embodiment 3. The diagnostic support apparatus 1100 includes the communication control unit 101, an image feature quantity comparison unit 1101, a data reception unit 1102, a pixel value transformation unit 1103, an image feature quantity calculation unit 1104, a base representation unit 1105, the normal coefficient storage unit 104, the nearest neighbor vector detection unit 106, the lesion determination unit 107, the threshold value memory unit 108, the determination result output unit 109, and the determination result display unit 110. Note that structural elements that are the same as those in FIG. 4 are denoted by the same reference numerals and a detailed description thereof will be omitted.

The image feature quantity comparison unit 1101 is configured to hold the image-feature-quantity management number for the image feature quantities (coefficients) of normal images stored in the normal coefficient storage unit 104 and to compare the image-feature-quantity management number 152 received from the image server 150 with the stored image-feature-quantity management number for matching. If the image-feature-quantity management numbers match, the image feature quantity comparison unit 1101 instructs the data reception unit 1102 to output the test data 151 to the nearest neighbor vector detection unit 106 through an output port B of the data reception unit 1102. Then, the detection of a lesion is performed in the same manner as with the diagnostic support apparatus 100 of Embodiment 1. When the image-feature-quantity management numbers do not match, the image feature quantity comparison unit 1101 instructs the data reception unit 1102 to output the test data 151 to the pixel value transformation unit 1103 through an output port A of the data reception unit 1102. Then, the pixel value transformation unit 1103 and the image feature quantity calculation unit 1104 transform the image feature quantities of the test data 151 to the image feature quantities of the same type as those corresponding to the base coefficient vectors stored in the normal coefficient storage unit 104.

Specifically, the pixel value transformation unit 1103 is configured to perform inverse transformation of the transformation represented by Expression 2 on the base coefficient vectors $\alpha_s$ of the test data 151 to restore the base coefficient vectors $\alpha_s$ to image feature quantities $f_s$. The pixel value transformation unit 1103 is further configured to restore the image feature quantities $f_s$ to pixel values. The processing for restoring the image feature quantities $f_s$ to the pixel values can be performed using a known technique. For example, when wavelet transformation is used to calculate the image feature quantities $f_s$, the image feature quantities $f_s$ can be restored to the pixel values through inverse wavelet transformation. When landmarks are used to calculate the image feature quantities $f_s$, the elements of the image feature quantity vectors correspond to the pixel values at the landmarks.

The image feature quantity calculation unit 1104 is configured to transform the pixel values obtained by the pixel value transformation unit 1103 to image feature quantities of the same type as those corresponding to the base coefficient vectors stored in the normal coefficient storage unit 104. The above processing resolves mismatching in image feature quantities between the base coefficient vectors $\alpha_s$ of the test data 151 received from the image server 150 and the base coefficient vectors stored in the normal coefficient storage unit 104.

The base representation unit 1105 is configured to transform the image feature quantities $f_s$ to the base coefficient vectors $\alpha_s$ using Expression 2 and to output the base coefficient vectors $\alpha_s$ to the nearest neighbor vector detection unit 106.

The processing described above allows the diagnostic support apparatus 1100 to detect a lesion by re-calculating the image feature quantities of a test image even if the image server 150 uses a different method for calculating image feature quantities. This enables a user who wants to send a request for diagnosis from one facility to another facility, to request diagnosis by simply transmitting the image feature quantities of a test image calculated in one facility to another facility without securing the matching of image feature qualities. Thus, the workflow of medical procedures can run smoothly. In other words, it is possible to accurately determine the presence or absence of a lesion site without depending on the method for describing or calculating image feature quantities.

Embodiment 4

The present embodiment describes a diagnostic support apparatus that shares image-feature-quantity management numbers among a plurality of facilities and therefore can share the image feature quantities of normal images without depending on different methods for calculating image feature quantities. In particular, the following describes an embodiment in which, when different methods are used to calculate image feature quantities, the image feature quantities are once restored to pixel values, and image feature quantities are re-calculated from the pixel values.

Figure 15:
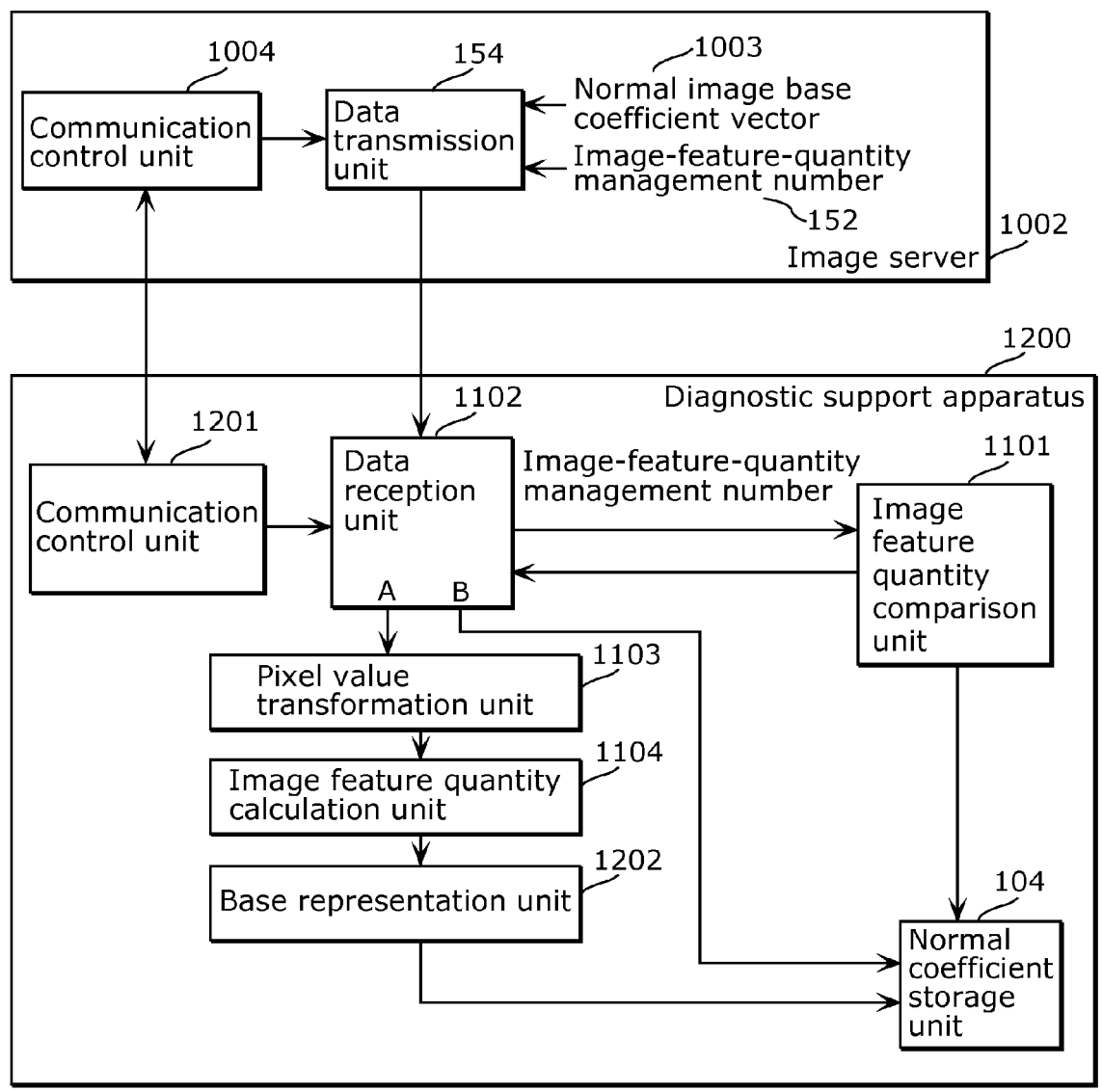
FIG. 15 is a block diagram showing a functional configuration of a diagnostic support apparatus according to Embodiment 4.

FIG. 15 is a block diagram showing a functional configuration of a diagnostic support apparatus 1200 according to Embodiment 4. The diagnostic support apparatus 1200 includes a communication control unit 1201, the image feature quantity comparison unit 1101, the data reception unit 1102, the pixel value transformation unit 1103, the image feature quantity calculation unit 1104, a base representation unit 1202, and the normal coefficient storage unit 104. Note that structural elements that are the same as those in FIG. 13 or 14 are denoted by the same reference numerals and a detailed description thereof will be omitted.

The communication control unit 1201 is configured to notify the image server 1002 that the diagnostic support apparatus 1200 will receive the normal image base coefficient vectors 1003 and the image-feature-quantity management number 152 from the image server 1002. The communication control unit 1201 is also configured to notify the data reception unit 1102 that the data reception unit 1102 will receive the normal image base coefficient vectors 1003 and the image-feature-quantity management number 152.

The base representation unit 1202 is configured to transform image feature quantities $f_p$ to base coefficient vectors $\alpha_p$ using Expression 2 and to output the base coefficient vectors $\alpha_p$ to the normal coefficient storage unit 104. Note that the image feature quantities $f_p$ are image feature quantities of the same type as those corresponding to the base coefficient vectors stored in the normal coefficient storage unit 104. The image feature quantities $f_p$ are calculated by the pixel value transformation unit 1103 and the image feature quantity calculation unit 1104.

The processing described above allows the diagnostic support apparatus 1200 to add normal image base coefficient vectors generated by image servers 1002 installed in other facilities into the normal coefficient storage unit 104. In particular, even if the diagnostic support apparatus 1200 and the image servers 1002 use different methods for calculating image feature quantities, the normal image base coefficient vectors generated by the image servers 1002 can be added into the normal coefficient storage unit 104. This allows normal images acquired in one facility to be transformed to normal image base coefficient vectors that can also be used in other facilities, thus leading to an improvement in the precision of diagnosis.

Note that the normal coefficient storage unit 104 storing updated data according to Embodiment 4 is applicable to the diagnostic support apparatus 1100 described in Embodiment 3.

Embodiment 5

The present embodiment describes a diagnostic support apparatus that shares image-feature-quantity management numbers among a plurality of facilities and therefore can detect a lesion site without depending on different methods for calculating image feature quantities. In particular, the following describes an embodiment in which, when each facility uses a different method for calculating image feature quantities, the method for calculating image feature quantities and base vectors are standardized among all facilities. The present embodiment describes an example in which the method for calculating image feature quantities and base vectors are standardized between an image server and a diagnostic support apparatus.

Figure 16:
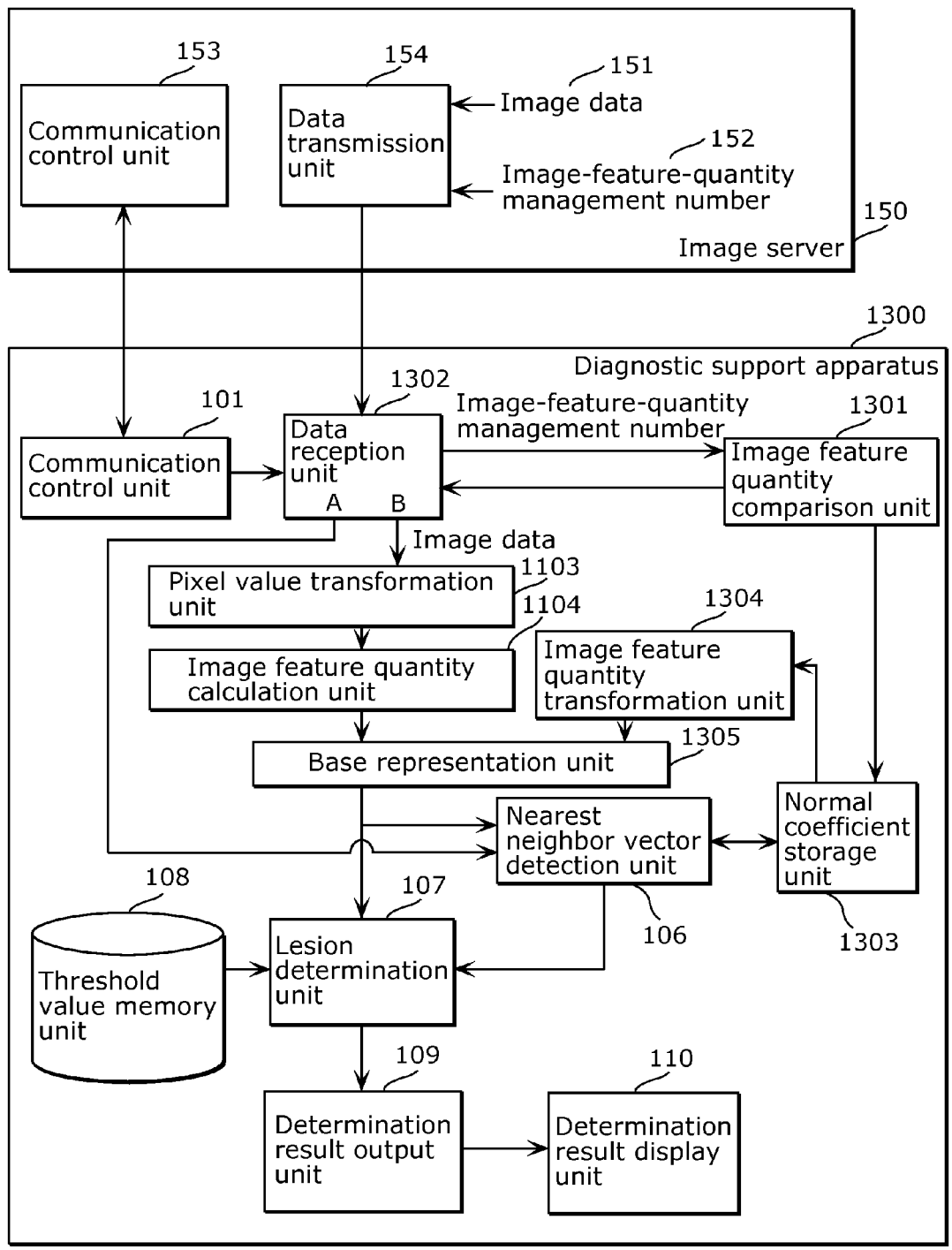
FIG. 16 is a block diagram showing a functional configuration of a diagnostic support apparatus according to Embodiment 5.

FIG. 16 is a block diagram showing a functional configuration of a diagnostic support apparatus 1300 according to Embodiment 5. The diagnostic support apparatus 1300 includes the communication control unit 101, an image feature quantity comparison unit 1301, a data reception unit 1302, the pixel value transformation unit 1103, the image feature quantity calculation unit 1104, an image feature quantity transformation unit 1304, a base representation unit 1305, a normal coefficient storage unit 1303, the nearest neighbor vector detection unit 106, the lesion determination unit 107, the threshold value memory unit 108, the determination result output unit 109, and the determination result display unit 110. Note that structural elements that are the same as those in FIG. 14 are denoted by the same reference numerals and a detailed description thereof will be omitted.

The image feature quantity comparison unit 1301 is configured to hold the image-feature-quantity management number for the image feature quantities (coefficients) of normal images stored in the normal coefficient storage unit 1303 and to compare the image-feature-quantity management number 152 received from the image server 150 with the stored image-feature-quantity management number for matching.

If the image-feature-quantity management numbers match, the image feature quantity comparison unit 1301 instructs the data reception unit 1302 to output the test data 151 to the nearest neighbor vector detection unit 106 through an output port A of the data reception unit 1302. Then, the diagnostic support apparatus 1300 detects a lesion in the same manner as with the diagnostic support apparatus 100 of Embodiment 1.

If the image-feature-quantity management numbers do not match, the image feature quantity comparison unit 1301 instructs the data reception unit 1302 to output the test data 151 to the pixel value transformation unit 1103 through an output port B of the data reception unit 1302. Then, the pixel value transformation unit 1103 and the image feature quantity calculation unit 1104 transform the image feature quantities of the test data 151 to image feature quantities of the same type as those corresponding to the base coefficient vectors stored in the normal coefficient storage unit 1303. The image feature quantity comparison unit 1301 also instructs the normal coefficient storage unit 1303 to output the base coefficient vectors stored in the normal coefficient storage unit 1303 to the image feature quantity transformation unit 1304. In accordance with the instruction, the normal coefficient storage unit 1303 outputs the base coefficient vectors to the image feature quantity transformation unit 1304.

The image feature quantity transformation unit 1304 is configured to perform inverse transformation of the transformation represented by Expression 2 on the base coefficient vectors received from the normal coefficient storage unit 1303 so as to transform the base coefficient vectors to image feature quantities, and to output the image feature quantities to the base representation unit 1305.

The base representation unit 1305 is configured to acquire the image feature quantities obtained by transforming the base coefficient vectors received from the image server 150 and the image feature quantities obtained by transforming the base coefficient vectors stored in the normal coefficient storage unit 1303. These two sets of image feature quantities are both calculated using the same calculation method. The base representation unit 1305 is configured to calculate base coefficient vectors from each set of the image feature quantities, using Expression 2. Accordingly, the base vectors are newly updated using both of the data in the image server 150 and the data in the diagnostic support apparatus 1300.

Through the processing described above, the diagnostic support apparatus 1300 re-calculates both of the base coefficient vectors included in the test data 151 and the base coefficient vectors stored in the normal coefficient storage unit 1303 to update the base vectors when the diagnostic support apparatus 1300 and the image server 150 uses a different method for calculating image feature quantities. This allows the diagnostic support apparatus 1300 to accurately detect a lesion. In other words, it is possible to accurately determine the presence or absence of a lesion site without depending on the method for describing or calculating image feature quantities.

Embodiment 6

The present embodiment describes a diagnostic support apparatus that shares image-feature-quantity management numbers among a plurality of facilities and therefore can share the image feature quantities of normal images without depending on different methods for calculating image feature quantities. In particular, the following describes an embodiment in which, when facilities use different methods for calculating image feature quantities, the method for calculating image feature quantities is standardized so that the base vectors can be shared among all facilities.

Figure 17:
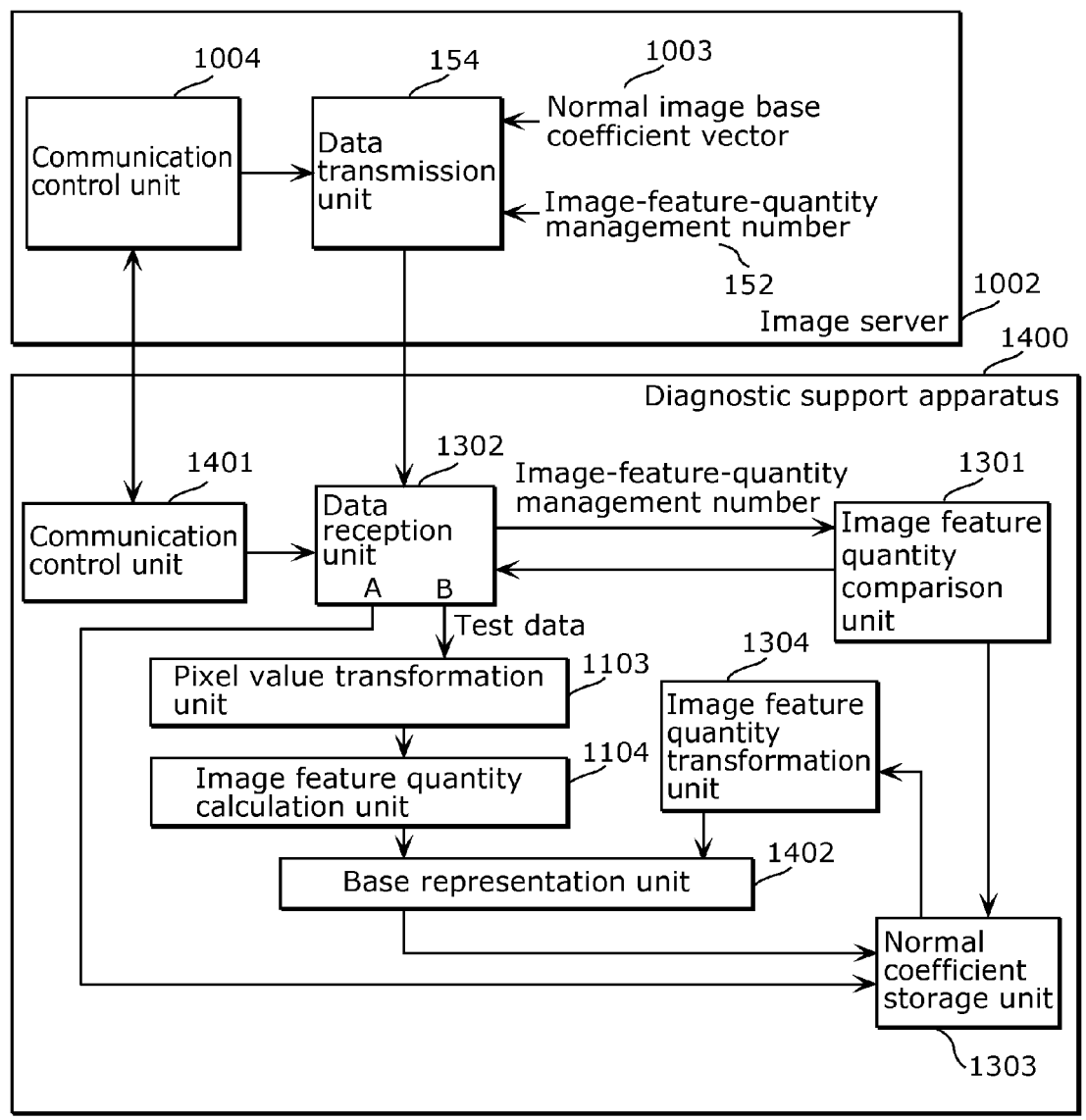
FIG. 17 is a block diagram showing a functional configuration of a diagnostic support apparatus according to Embodiment 6.

FIG. 17 is a block diagram showing a functional configuration of a diagnostic support apparatus 1400 according to Embodiment 6. The diagnostic support apparatus 1400 includes a communication control unit 1401, the image feature quantity comparison unit 1301, the data reception unit 1302, the pixel value transformation unit 1103, the image feature quantity calculation unit 1104, a base representation unit 1402, the normal coefficient storage unit 1303, and the image feature quantity transformation unit 1304. Note that structural elements that are the same as those in FIG. 14, 15, or 16 are denoted by the same reference numerals and a detailed description thereof will be omitted.

The communication control unit 1401 is configured to notify the image server 1002 that the diagnostic support apparatus 1400 will receive the normal image base coefficient vectors 1003 and the image-feature-quantity management number 152 from the image server 1002. The communication control unit 1401 is also configured to notify the data reception unit 1302 that the data reception unit 1302 will receive the normal image base coefficient vectors 1003 and the image-feature-quantity management number 152.

The base representation unit 1402 is configured to transform image feature quantities $f_p$ to base coefficient vectors $\alpha_p$ using Expression 2 and to output the base coefficient vectors $\alpha_p$ to the normal coefficient storage unit 1303. Note that the image feature quantities $f_p$ are either the image feature quantities output from the image feature quantity calculation unit 1104 or the image feature quantities output from the image feature quantity transformation unit 1304. The image feature quantities output from the image feature quantity calculation unit 1104 are the image feature quantities calculated from the normal image base coefficient vectors 1003 using the same calculation method as that used to calculate the image feature quantities corresponding to the base coefficient vectors stored in the normal coefficient storage unit 1303. The image feature quantities output from the image feature quantity transformation unit 1304 are the image feature quantities transformed from the base coefficient vectors stored in the normal coefficient storage unit 1303.

The processing described above allows the diagnostic support apparatus 1400 to add normal image base coefficient vectors generated by image servers 1002 installed in other facilities into the normal coefficient storage unit 1303. In particular, even if the diagnostic support apparatus 1400 and the image servers 1002 use different methods for calculating image feature quantities, the normal image base coefficient vectors generated by the image servers 1002 can be added into the normal coefficient storage unit 1303. This allows the diagnostic support apparatus 1400 to support the detection of a lesion without depending on different factors such as different patient shapes, different shooting devices, and different shooting conditions.

Note that the normal coefficient storage unit 1303 storing updated data according to Embodiment 6 is applicable to the diagnostic support apparatus 1300 described in Embodiment 5.

As described above, the diagnostic support apparatuses according to Embodiments 1 to 6 described above can support the detection of a lesion without depending on different methods for calculating image feature quantities and any difference in data of normal images. In addition, the diagnostic support apparatus can stably and efficiently generate normal images. In other words, the processing for comparing a test image with normal images based on the memories of image-based diagnosticians can be executed by a computer. This makes it possible to objectively support diagnosis by image-based diagnosticians. Moreover, the results of diagnosis can be used in various scenes such as in the scene of informed consent and in the scenes of medical education and basic medicine.

It is also possible to efficiently and accurately detect a lesion site. Image-based diagnosticians make new tests while referencing past case data that is being updated day by day. Thus, the detection of a lesion aided with a computer improves the work efficiency of image-based diagnosticians and allows the medical workflow to run smoothly. Since the confirmation of a disease name and the condition of the disease has significant influences on the determination of a treatment plan, diagnostic support by the diagnostic support apparatuses can contribute greatly to improvements in the efficiency and quality of the entire medical field.

The structural elements in the above-described embodiments may be configured in the form of an exclusive hardware product or may be implemented by executing a software program suitable for the structural elements. The structural elements may be implemented by a program executing unit such as a CPU or a processor reading and executing a software program recorded on the hard disk or a recording medium such as a semiconductor memory. Note here that the software program implementing the diagnostic support apparatuses of the above-described embodiments is as described below.

Specifically, the software program causes the computer to execute a base vector matching step, a lesion determination step, and a determination result output step. The base vector matching step is of matching base vectors and base vectors, the base vectors being different from the base vectors, the base vectors being used as a basis to represent a test feature quantity that is an image feature quantity of a test image in which presence of an image of a lesion site is unknown, and the base vectors being used as a basis to represent a normal feature quantity that is an image feature quantity of a normal image that does not include an image of a lesion site. The lesion determination step is of determining that the test image includes an image of a lesion site when a difference between a coefficient and a coefficient is greater than a determination threshold value, the coefficient being a coefficient with which the test feature quantity is transformed to a base representation, and the coefficient being a coefficient with which the normal feature quantity is transformed to a base representation. The determination result output step is of outputting the determination result obtained in the lesion determination step.

Note that the standardization of the base vectors among a plurality of facilities according to one or more exemplary embodiments eliminates the need to transmit base vectors among the facilities. Thus, the data of only base coefficient vectors are exchanged among facilities. The base coefficient vectors function only in combination with the base vectors and thus have no meaning by themselves. From this, exchanging only the base coefficient vectors among facilities has the advantage in terms of information security that even if the third party acquires the base coefficient vectors exchanged among facilities, the base coefficient vectors have no use value.

Figure 18:
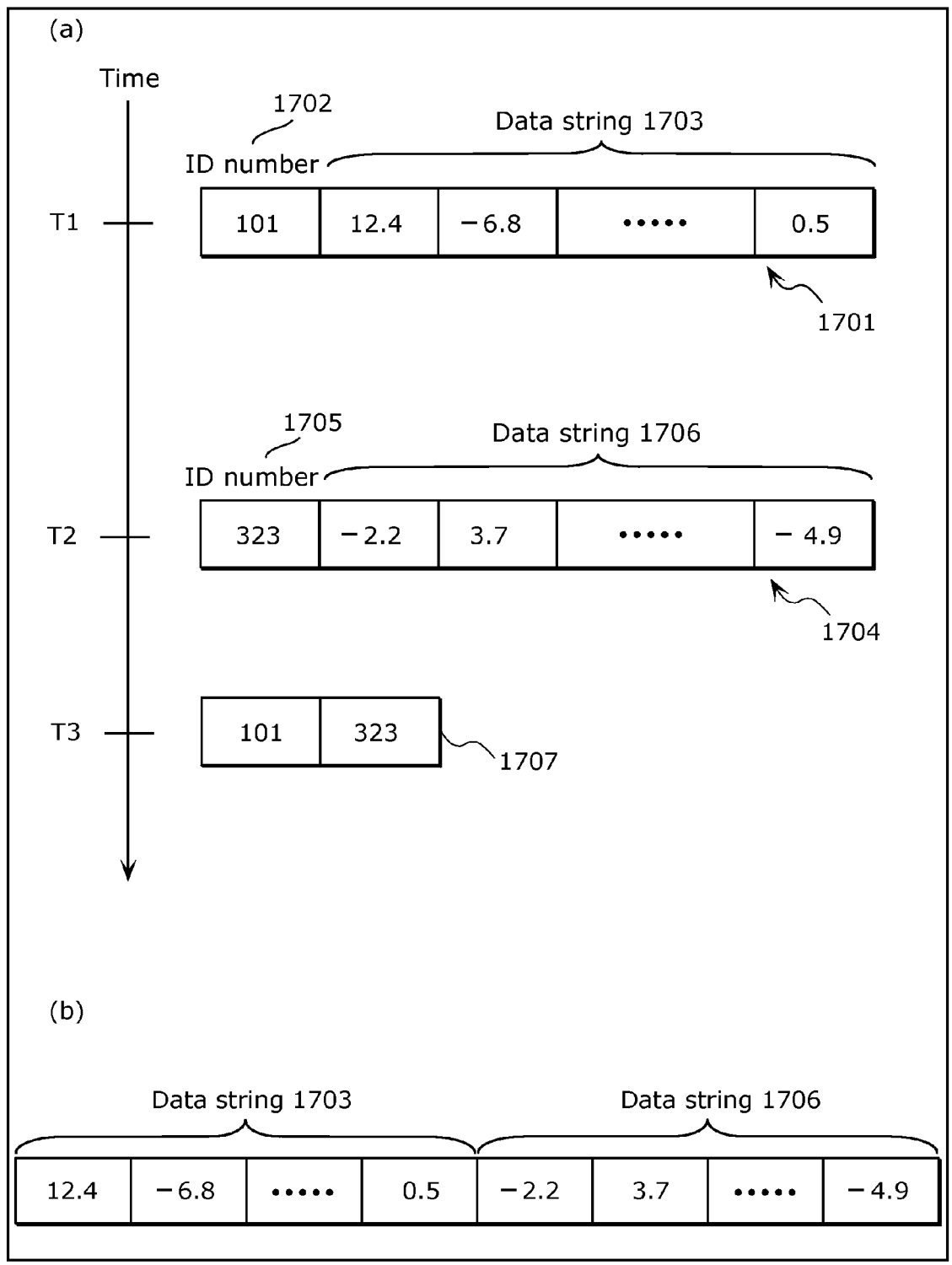
FIG. 18 illustrates an exemplary method for transmitting base vectors.

Consider a case where image data in a facility A is transmitted to a facility B and base vectors are calculated in the facility B, using both of the image data in the facility A and image data in the facility B. The facility B holds base vectors that are common to the image data in the facility A and the image data in the facility B, but at this time, the facility A does not hold these base vectors. The common base vectors calculated in the facility B may be transmitted as they are to the facility A, but this is too risky in terms of security because if these base vectors are once known by the third party, it is possible for the third party to restore original images, using subsequently acquired base coefficient vectors. In view of this, it is conceivable to divide a signal string that represents base vectors into a plurality of pieces and transmit these pieces at different times, as shown in (a) in FIG. 18. This reduces the risk of information leakage.

Specifically, a signal string 1701 transmitted at time T1 from the facility B to the facility A consists of an ID number 1702 and a data string 1703. A signal string 1704 transmitted at time T2 from the facility B to the facility A consists of an ID number 1705 and a data string 1706. That is, the signal strings 1701 and 1704 are transmitted at different times T1 and T2 on a network. The facility B further transmits a signal string 1707 to the facility A at time T3, the signal string 1707 including concatenation information indicating a concatenation of the signal strings 1701 and 1704. The facility A reads the signal string 1707 and acquires the concatenation information indicated by the signal string 1707. In the example shown in (a) in FIG. 18, the ID numbers "101" and "323" are read from the signal string 1707 as the concatenation information. In accordance with this concatenation information, the facility A selects the signal string 1701 having the ID number 1702 of "101" and the signal string 1704 having the ID number 1705 of "323" in this order. The facility A also combines the data string 1703 included in the signal string 1701 and the data string 1706 included in the signal string 1704 in this order as shown in part (b) in FIG. 18. For example, the signal strings 1701, 1704, and 1707 are transmitted from the data transmission unit 154 of the image server 150 to the data reception unit 102 of the diagnostic support apparatus 100. The data reception unit 102 restores the base vectors of the image feature quantities of a test image in the same manner as described above on the basis of the signal strings 1701, 1704, and 1707.

Figure 19:
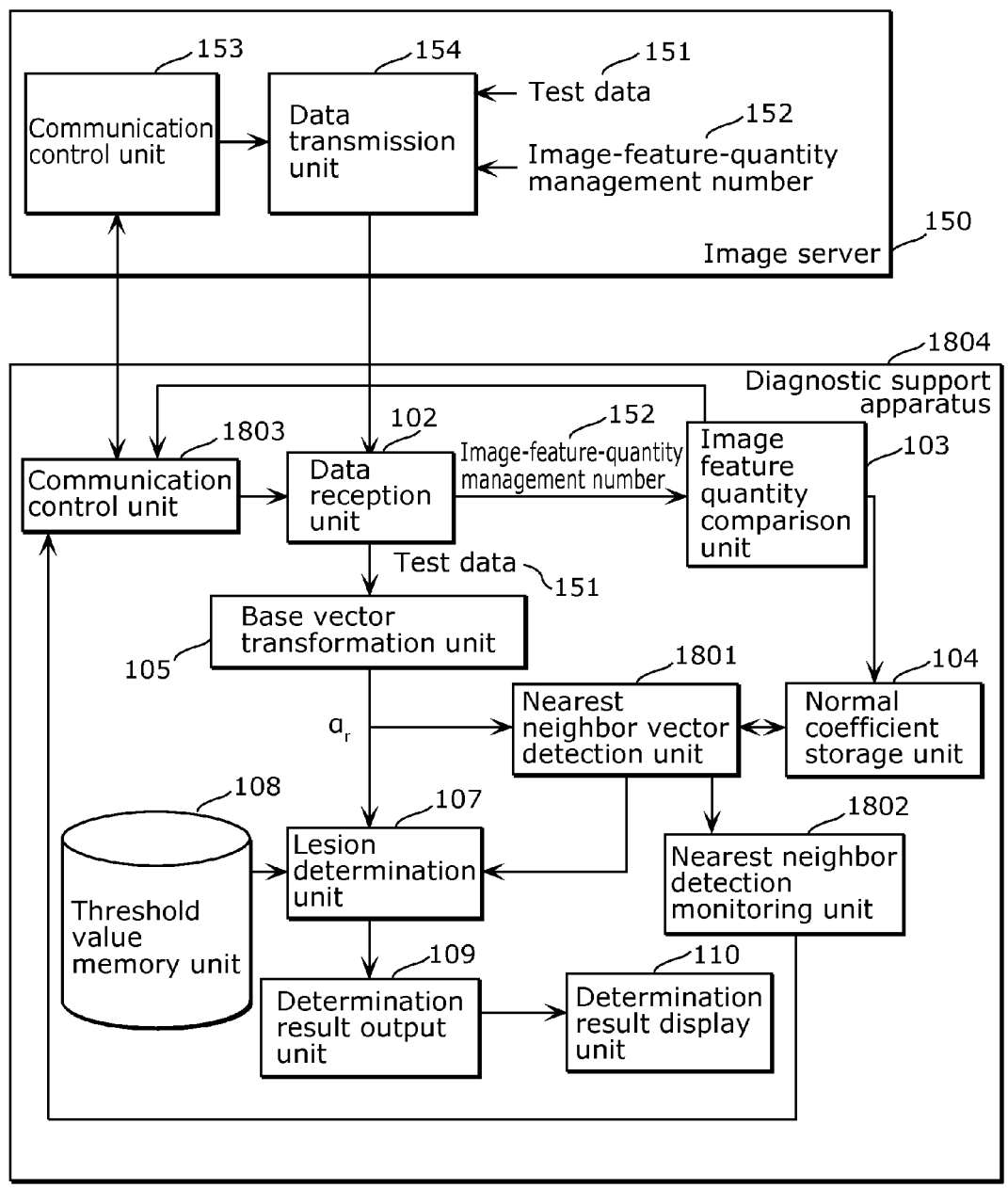
FIG. 19 is a block diagram showing a functional configuration of a diagnostic support apparatus capable of updating the base vectors for normal images.

Note that the base vectors of the image feature quantities of normal images may be updated when, for example, a disease name that has not yet been registered has been received with reference to the classification of disease names shown in FIG. 11. Alternatively, the base vectors may be updated when a difference between a test image base coefficient vector and the detected nearest neighbor normal image base coefficient vector exceeds a reference value. Specifically, the diagnostic support apparatus 100 shown in FIG. 4 may be replaced with a diagnostic support apparatus 1804 shown in FIG. 19. The diagnostic support apparatus 1804 differs from the diagnostic support apparatus 100 in configuration that the communication control unit 101 and the nearest neighbor vector detection unit 106 are replaced respectively by a communication control unit 1803 and a nearest neighbor vector detection unit 1801, and a nearest neighbor detection monitoring unit 1802 is additionally provided. The communication control unit 1803 and the nearest neighbor vector detection unit 1801, which respectively have the same functions as the communication control unit 101 and the nearest neighbor vector detection unit 106, further have additional functions described below. The nearest neighbor vector detection unit 1801 is configured to, when a nearest neighbor vector has been detected, output a difference between the normal image base coefficient vector and the test image base coefficient vector to the nearest neighbor detection monitoring unit 1802. The nearest neighbor detection monitoring unit 1802 is configured to, when the difference between the normal image base coefficient vector and the test image base coefficient vector exceeds a reference value, determine that an unexpected test image has been received and instruct the communication control unit 1803 to update the base vectors. The communication control unit 1803 is configured to perform control for updating the base vectors.

The diagnostic support apparatus 100 according to Embodiment 1 is configured to determine the presence or absence of a lesion site only when the same method is used to calculate the image feature quantities of a test image and the image feature quantities of normal images. In addition to this, the diagnostic support apparatus 100 may be configured to, when different methods are used to calculate the image feature quantities of a test image and the image feature quantities of normal images, determine the presence or absence of a lesion site by executing the same processing as that performed by the diagnostic support apparatus 1100 described in Embodiment 3 or the diagnostic support apparatus 1300 described in Embodiment 5.

While the above has been a description of the diagnostic support apparatuses according to one or more exemplary embodiments, the inventive concept is not limited to these exemplary embodiments. Those skilled in the art will readily appreciate that various modifications may be made in the exemplary embodiments, and other embodiments may be made by arbitrarily combining some of the structural elements of different exemplary embodiments without departing from the principles and spirit of the inventive concept.

The subject matter disclosed herein is to be considered descriptive and illustrative only, and the appended Claims are of a scope intended to cover and encompass not only the particular embodiments disclosed, but also equivalent structures, methods, and/or uses.

INDUSTRIAL APPLICABILITY

One or more exemplary embodiments disclosed herein are applicable to, for example, diagnostic support apparatuses that specify lesion sites from medical images to thereby support image-based diagnosis by doctors.

The invention claimed is:

1. A diagnostic support apparatus comprising:
a hardware processor; and
a non-transitory memory having stored thereon executable instructions, which when executed by the hardware processor, cause the diagnostic support apparatus to operate as:
a base vector matching unit configured to match test image base vectors and normal image base vectors, the test image base vectors being different from the normal image base vectors, the test image base vectors being used as a basis to represent a test feature quantity that is an image feature quantity of a test image in which presence of an image of a lesion site is unknown, and the normal image base vectors being used as a basis to represent a normal feature quantity that is an image feature quantity of a normal image that does not include an image of a lesion site;
a lesion determination unit configured to determine that the test image includes an image of a lesion site when a difference between a test image base coefficient and a normal image base coefficient is greater than a determination threshold value, the test image base coefficient being a coefficient with which the test feature quantity is transformed to a base representation, and the normal image base coefficient being a coefficient with which the normal feature quantity is transformed to a base representation; and
a determination result output unit configured to output a result of the determination by the lesion determination unit,
wherein the base vector matching unit includes:
a pixel value transformation unit configured to, when the test feature quantity and the normal feature quantity do not match in type, transform the test feature quantity to a pixel value to restore the test image prior to transformation of the test image to obtain the test feature quantity, the pixel value being obtained by using an inverse of the transformation used to obtain the test feature quantity;
an image feature quantity calculation unit configured to calculate an image feature quantity of the same type as the normal feature quantity from the restored test image; and
a base representation unit configured to represent the image feature quantity calculated by the image feature quantity calculation unit as a linear combination of the normal image base vectors with a coefficient, and
the lesion determination unit is configured to determine that the test image includes an image of a lesion site when a difference between the normal image base coefficient and the coefficient used by the base representation unit to represent the calculated image feature quantity is greater than the determination threshold value.

2. The diagnostic support apparatus according to claim 1, wherein the executable instructions, when executed by the hardware processor, cause the diagnostic support apparatus to further operate as
a normal coefficient storage unit configured to store at least one of the normal image base coefficient,
the pixel value transformation unit is further configured to receive an image feature quantity of a normal image from an external apparatus and transform the received image feature quantity to a pixel value to restore the normal image, the image feature quantity being of a different type from the normal feature quantity,
the image feature quantity calculation unit is further configured to calculate an image feature quantity of the same type as the normal feature quantity from the restored normal image, and
the base representation unit is further configured to represent the image feature quantity calculated by the image feature quantity calculation unit as a linear combination of the normal image base vectors with a coefficient, and to add the coefficient into the normal coefficient storage unit.

3. The diagnostic support apparatus according to claim 1, wherein the executable instructions, when executed by the hardware processor, cause the diagnostic support apparatus to further operate as
an image feature quantity transformation unit configured to transform the normal image base coefficient to the normal feature quantity, and
the base representation unit is configured to calculate base vectors from the normal feature quantity transformed by the image feature quantity transformation unit and the image feature quantity calculated by the image feature quantity calculation unit, and to represent each of the transformed normal feature quantity and the calculated image feature quantity as a linear combination of the calculated base vectors with a coefficient.

4. The diagnostic support apparatus according to claim 3, wherein the executable instructions, when executed by the hardware processor, cause the diagnostic support apparatus to further operate as
a normal coefficient storage unit configured to store at least one of the normal image base coefficient,
the pixel value transformation unit is further configured to receive an image feature quantity of a normal image from an external apparatus and transform the received image feature quantity to a pixel value to restore the normal image, the image feature quantity being of a different type from the normal feature quantity,
the image feature quantity calculation unit is further configured to calculate an image feature quantity of the same type as the normal feature quantity from the restored normal image, and
the base representation unit is further configured to calculate base vectors from the normal feature quantity transformed by the image feature quantity transformation unit and the image feature quantity calculated by the image feature quantity calculation unit, to represent the calculated image feature quantity as a linear combination of the calculated base vectors with a coefficient, and to add the coefficient into the normal coefficient storage unit.

* * * * *